(12) United States Patent
McBride

(10) Patent No.: US 8,695,637 B2
(45) Date of Patent: Apr. 15, 2014

(54) GATE VALVE PRESSURE EQUALIZATION SYSTEM

(76) Inventor: James David McBride, Gladewater, TX (US)

( * ) Notice: Subject to any disclaimer, the term of this patent is extended or adjusted under 35 U.S.C. 154(b) by 181 days.

(21) Appl. No.: 13/440,120

(22) Filed: Apr. 5, 2012

(65) Prior Publication Data

US 2013/0263954 A1  Oct. 10, 2013

(51) Int. Cl.
| F16K 25/00 | (2006.01) |
| F16K 3/00 | (2006.01) |
| F16K 3/18 | (2006.01) |
| F16K 17/40 | (2006.01) |
| E21B 34/10 | (2006.01) |

(52) U.S. Cl.
USPC ........ 137/630.12; 137/629; 251/193; 251/326

(58) Field of Classification Search
USPC .................. 251/172, 175, 193, 326; 137/629, 137/630.12, 630.19, 630.22, 81
See application file for complete search history.

(56) References Cited

U.S. PATENT DOCUMENTS

| 2,705,610 | A | | 4/1955 | Hjulian |
| 3,060,964 | A | * | 10/1962 | Bagwell .................... 137/601.15 |
| 3,078,865 | A | * | 2/1963 | Estes et al. ................ 137/246.22 |
| 3,135,285 | A | | 6/1964 | Volpin |
| 3,295,546 | A | | 1/1967 | Carlton |
| 3,378,224 | A | | 4/1968 | Boyle |
| 4,515,174 | A | | 5/1985 | Hollister et al. |
| 4,671,489 | A | * | 6/1987 | Jankovic ........................ 251/327 |
| 4,824,074 | A | * | 4/1989 | Baugh ........................... 251/172 |
| 4,934,652 | A | | 6/1990 | Golden |
| 5,291,912 | A | | 3/1994 | Comeaux |
| 5,370,155 | A | * | 12/1994 | Gyongyossy ............ 137/630.12 |
| 6,990,991 | B2 | * | 1/2006 | Meckes et al. .................... 137/1 |
| 7,100,893 | B2 | * | 9/2006 | Williams et al. .............. 251/328 |
| 2009/0256099 | A1 | | 10/2009 | Palmer |

\* cited by examiner

*Primary Examiner* — Eric Keasel
*Assistant Examiner* — Kevin Barss
(74) *Attorney, Agent, or Firm* — Eric C. Schmalbach

(57) ABSTRACT

Embodiments of a gate valve equalization system comprise: a gate valve; a gate; a preloading valve arrangement; a floating coupler assembly; a relief valve arrangement; and a means for control. The preloading valve arrangement permits fluid to enter the valve body from the upstream side of the gate. The means for control serves as a control interface allowing engagement of the floating coupler assembly and opening/closing of the gate valve. Engagement of the floating coupler, engages the assembly relief valve arrangement and allows redistribution of fluid pressure and circulation of fluid from one side of the gate to opposing side of the gate within the gate valve.

17 Claims, 24 Drawing Sheets

GATE VALVE PRESSURE EQUALIZATION SYSTEM

BACKGROUND

Gates valves may be used to permit or restrict the flow of fluids. A gate valve comprises a centrally disposed gate within the gate valve, movable between open and closed positions. Movement of the gate between open and closed positions permits or restricts the flow of fluid between upstream and downstream sides of the gate valve through a central concavity in the gate valve. A problem encountered during operation is difficulty of operation of the gate when fluid pressure is unbalanced between both sides of the gate.

Unbalanced fluid pressure may be caused by obstruction of the flow path of a fluid. Obstruction of the flow causes a fluid pressure differential between upstream and downstream sides of the gate. Fluid pressure differential increases friction on one side of the gate, while the opposing side of the gate experiences lower friction. Increased pressure differential between upstream and downstream sides of the gate causes greater friction to be applied to one side of the gate (the side obstructing the flow of fluid). The force required to overcome the friction increases with mounting pressure, thereby requiring an operator to exert greater force to open or close the gate.

In some applications implementing gate valves, fluid pressure levels may exceed 15,000 psi. Such high pressure may cause unsafe conditions for operations, due to the possibility of break of rupture of the components. Increased pressure may also cause damage to the gate valve. Therefore, it is desirable to equalize the pressure on both sides of the gate during operation.

Attempts have been made to balance pressure. However, such attempts suffer from one or numerous deficiencies. For example, high pressure lines may be run externally on gate valve surfaces to transfer pressure between opposing sides of the gate. Such high pressure lines must often be securely restrained to prevent them from thrashing about under high pressure. As the high pressure lines are externally mounted, they must also be protected against damage.

Ball screw stems haven been used with large handwheels for leverage. However, such ball screw stems can unseal the gate from the seat seal. This method of operation may rip the surfaces of the gate, thereby causing wear on both the gate and the seat seal. The high pressures involved may cause a grinding against the surfaces of the gate valve. Such grinding action can cause gate valve leak or malfunction.

A series of externally mounted steel needle valves may be placed to equalize the pressure on the gate. However such valves may fail under high pressure. Therefore, a need exists for a gate valve pressure equalization system allowing safe and effective means of fluid pressure redistribution in a gate valve.

SUMMARY

Embodiments of the invention are directed to solving the need for a gate valve pressure equalization system allowing safe and effective means of redistributing pressure in a gate valve. Embodiments of a gate valve pressure equalization system comprise: a gate valve; a gate; a preloading valve arrangement; a floating coupler assembly; a relief valve arrangement; and a means for control. In embodiments of the invention, the gate valve has an upstream cavity and a downstream cavity, and a gate mounted in the gate valve, wherein the gate is movable between open and closed position of the gate valve. The gate valve has a preloading valve arrangement, which permits fluid to enter the valve body from the upstream side of the gate. The means for control serves as a control interface allowing engagement of the floating coupler assembly and opening/closing of the gate valve. Engagement of the floating coupler, engages the assembly relief valve arrangement and allows redistribution of fluid pressure and circulation of fluid from one side of the gate to opposing side of the gate within the gate valve.

In an exemplary embodiment, a gate valve exists such that it has a valve body, a valve body chamber, an upstream cavity, and a downstream cavity. The gate is sealed by a bonnet. A gate is movable between open and closed position, within the gate valve body, and positioned within the valve body chamber. The gate has a gate cavity, an upstream gate surface, and a downstream gate surface. The gate has an equalizing port on a downstream gate surface. A preloading valve arrangement has a preloading relief port and check valve located proximate the upstream side of the valve body. A floating coupler assembly has a slide nut, a gate nut, a stop bolt, a lift arm, and a lift arm lock. Affixed to the slide nut is a lift arm. A relief valve arrangement is fixedly attached to the gate, and has an insert body, a relief bolt, a stem seal, a spring nut, a lock nut, a relief cavity, a return spring, and a relief port. The insert body depends downwardly into an upper gate surface through a relief cavity, meeting the equalizing port on the downstream side of the gate. A means for control comprises a handwheel and stem. The stem is centrally disposed through the floating coupler assembly and into an upper gate surface. During operation, fluid is permitted to enter the valve body chamber through the preloading relief port and check valve. The floating coupler assembly is not fixedly attached to the gate, thereby allowing a stem to turn freely. Axial rotation of the stem causes the slide nut to rise and fall. Rising and falling of the slide nut causes the lift arm to rise and fall. Rising of the lift arm unseats the stem seal, and causes fluid to flow from the valve body chamber, through the insert body, relief port, equalizing port, and into the downstream cavity before movement of the gate within the valve body chamber. The circulation of fluid between upstream and downstream sides of the gate prior to gate movement provides a lower pressure differential between both sides of the gate, thereby lowering the amount of force required to lift/lower the gate. After the slide nut and lift arm have traveled a limited distance, further axial rotation of the stem causes the gate to rise/fall within the valve body chamber.

In a first alternate embodiment, the path of a relief port depending through the gate may deviate from the exemplary embodiment.

In a second alternate embodiment, the preloading valve arrangement comprises multiple stacked check valves and a preloading relief port.

Other embodiments may include alternate equivalent structures, yet still implement the invention concept described herein. For example, the gate may be lowered into an open position and raised to closed position. The stem may be a rising stem or a non-rising stem.

The gate valve may also be: a sluice valve; a knife gate; a slide gate; a parallel gate valve; a flexible wedge gate valve; a solid wedge gate valve; a split wedge gate valve; a globe valve; or a parallel slide gate.

Differing types of relief valves may be used, including: a spring-loaded pressure release valve; a ruptured disc and pin valve; or a balanced bellows valve.

The bonnet may also be: a screw-in bonnet; a union bonnet; or a pressure-sealed bonnet.

The preloading valve arrangement may implement one or a plurality of valves within the gate valve. Such valves may be of differing types and permutations thereof.

BRIEF DESCRIPTION OF THE DRAWINGS

These and other features, aspects and advantages of embodiments of the invention will become better understood with regard to the following description, appended claims, and accompanying drawings where:

DESCRIPTION

Overview

Figure 1:
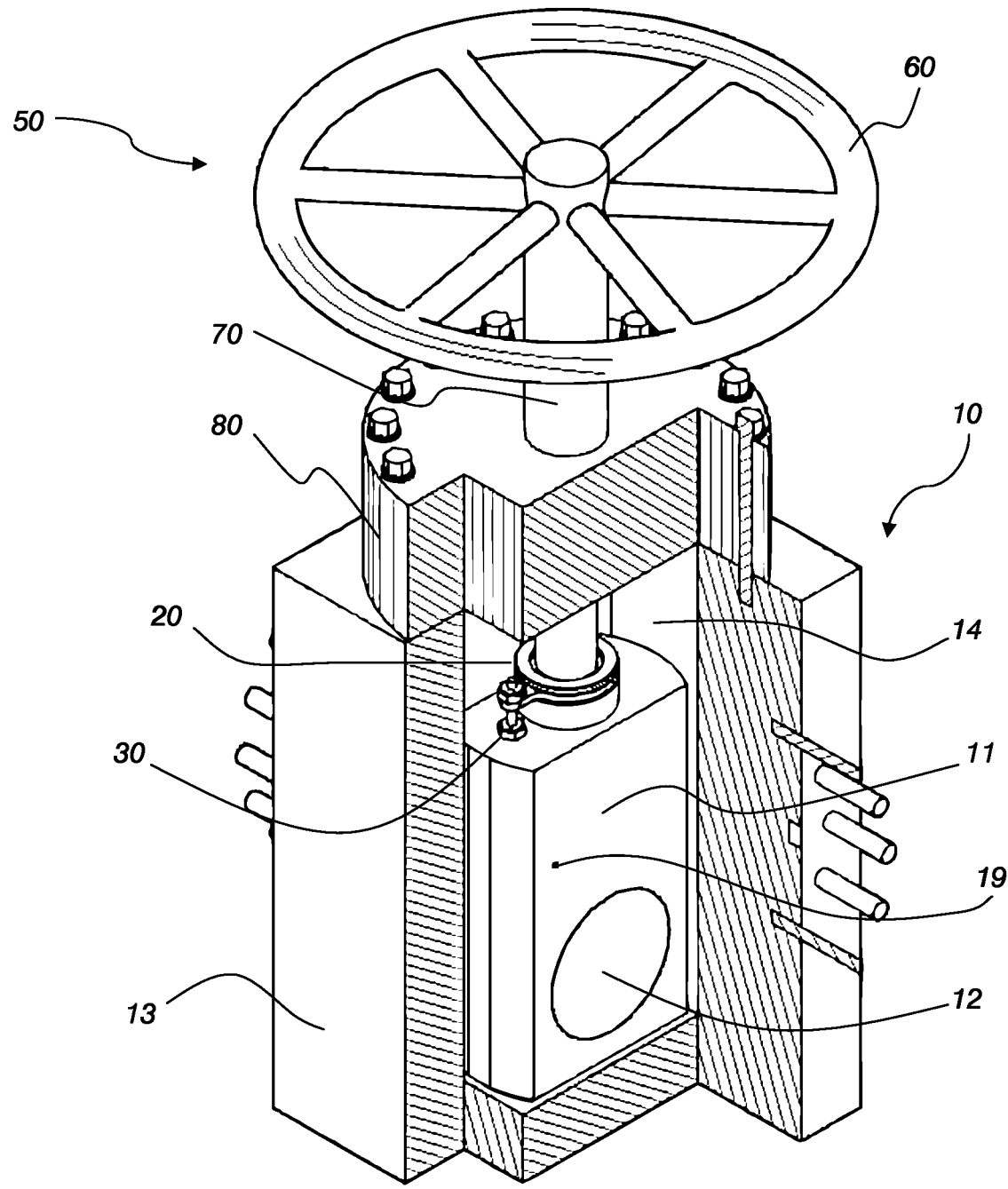
FIG. 1 illustrates a partial sectional perspective view of a gate valve pressure equalization system according to an embodiment of the invention.
Figure 2:
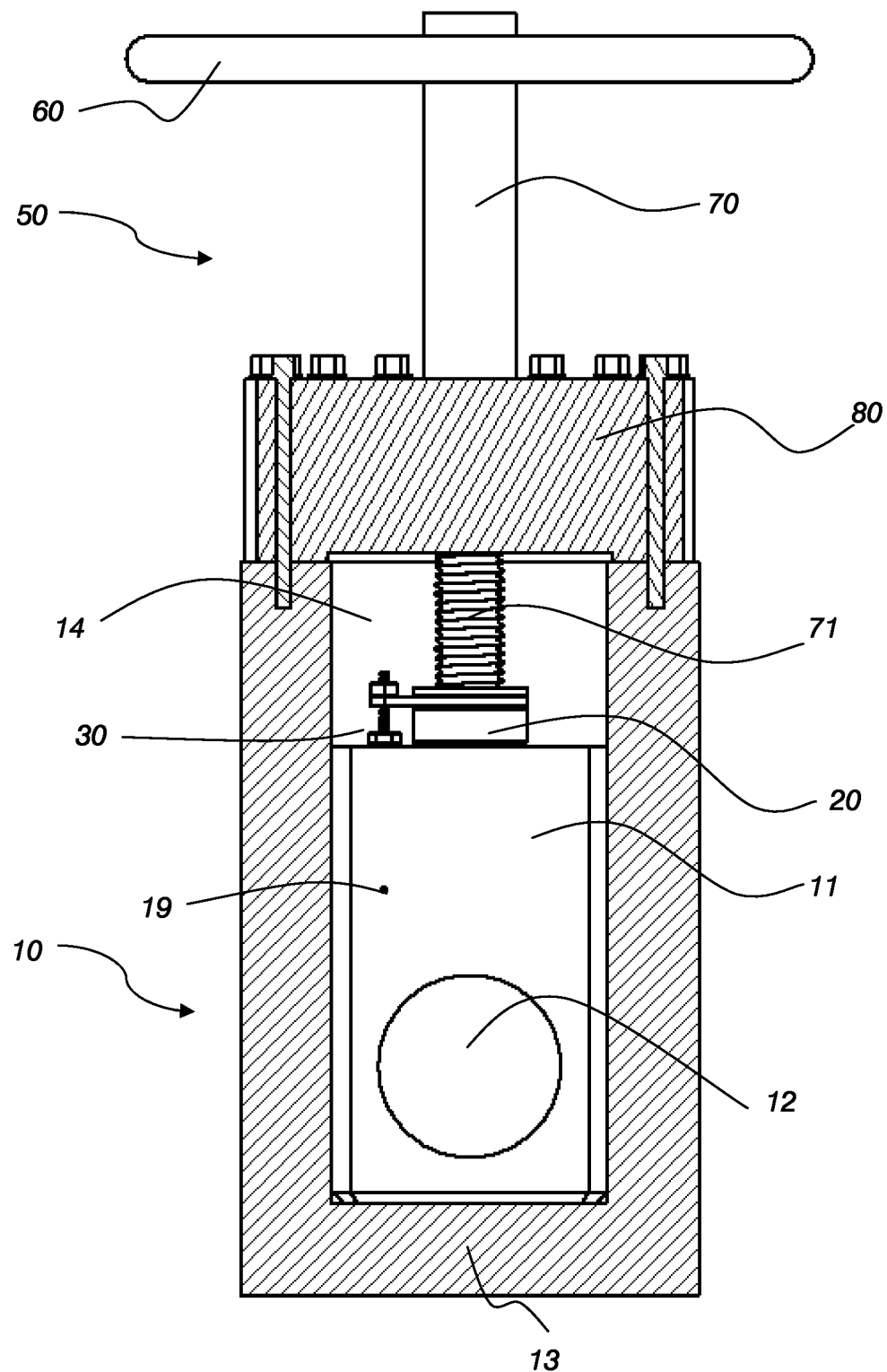
FIG. 2 illustrates a cross-sectional front view of a gate valve pressure equalization system in a closed position, according to the embodiment of FIG. 1.

The following detailed description illustrates the preferred embodiment of the invention by way of example. This description will clearly enable one skilled in the art to make and use the invention, and will set forth the best mode of doing so. The embodiments listed herein are not intended to limit the scope of the invention. Several alternative embodiments are set forth, and it is contemplated that the invention may include other permutations, arrangements, adaptations, uses, and variations of the inventive concept set forth herein.

As shown in the accompanying drawing figures an embodiment of a gate valve pressure equalization system comprises: a gate valve 10; a gate 11 mounted in said gate valve 10, wherein said gate 11 is movable between open and closed position of said gate valve 10; a preloading valve arrangement 90; a floating coupler assembly 20; a relief valve arrangement 30; and a means for control 50, wherein said means for control 50 actuates said floating coupler assembly 20 to engage said relief valve arrangement 30, thereby allowing redistribution of fluid pressure between opposing sides of the gate 11.

DETAILED DESCRIPTION OF THE ELEMENTS

Figure 3:
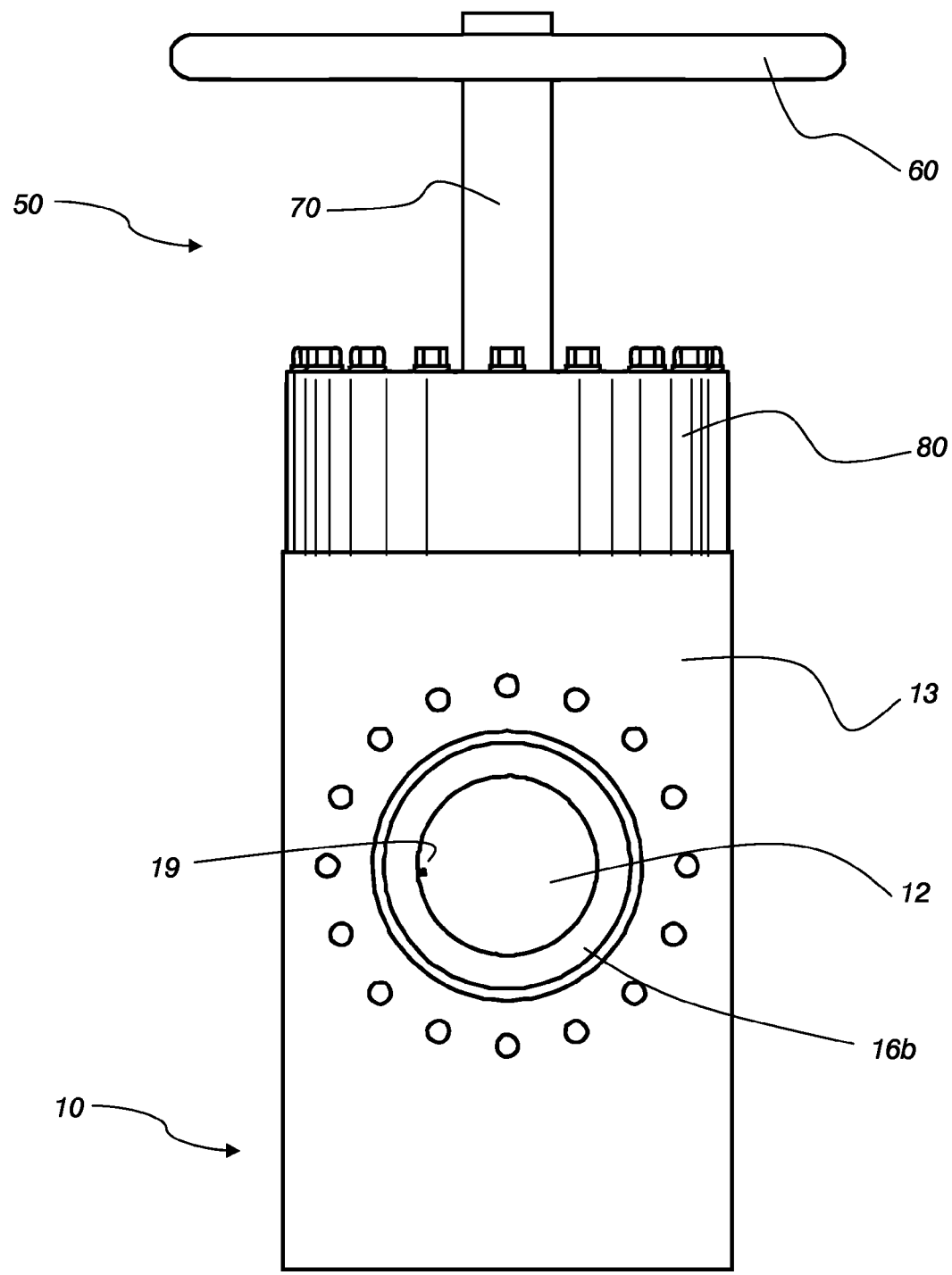
FIG. 3 illustrates a front view of a gate valve pressure equalization system in an open position, according to the embodiment of FIG. 1.
Figure 4:
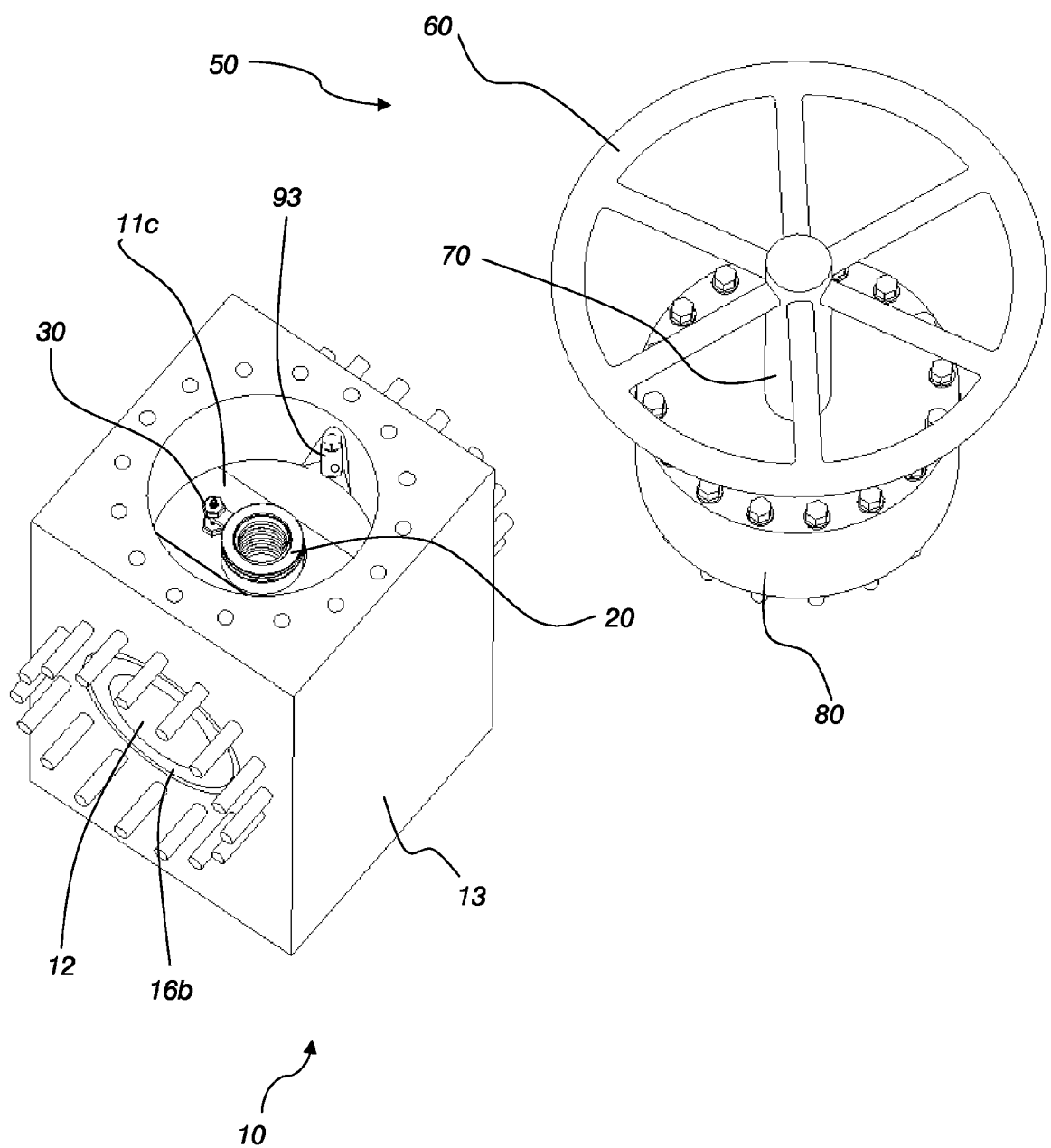
FIG. 4 illustrates a partial exploded perspective view of a gate valve pressure equalization system, according to the embodiment of FIG. 1.
Figure 5:
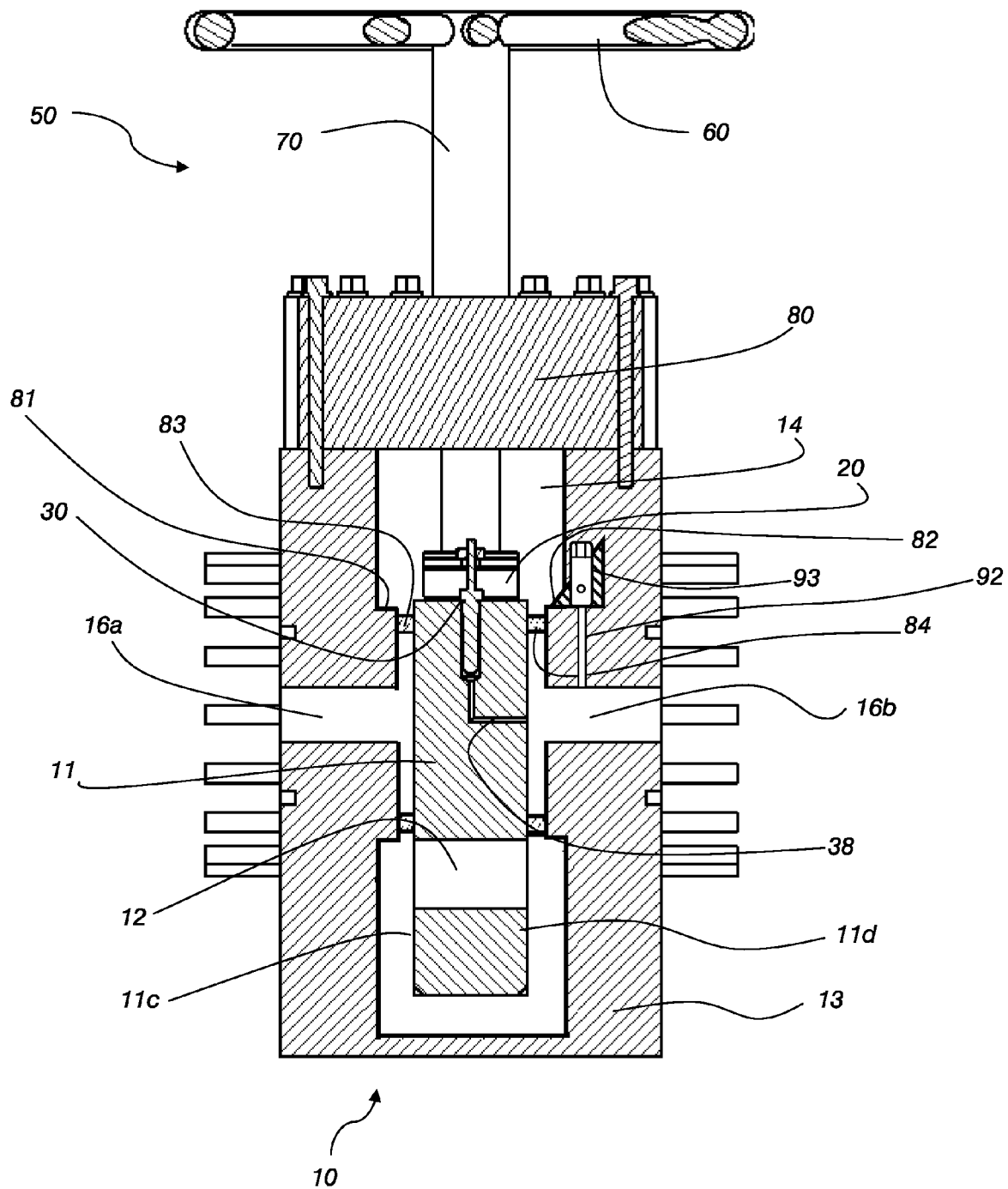
FIG. 5 illustrates a cross-sectional side view of a gate valve pressure equalization system in a closed position, according to the embodiment of FIG. 1.
Figure 18:
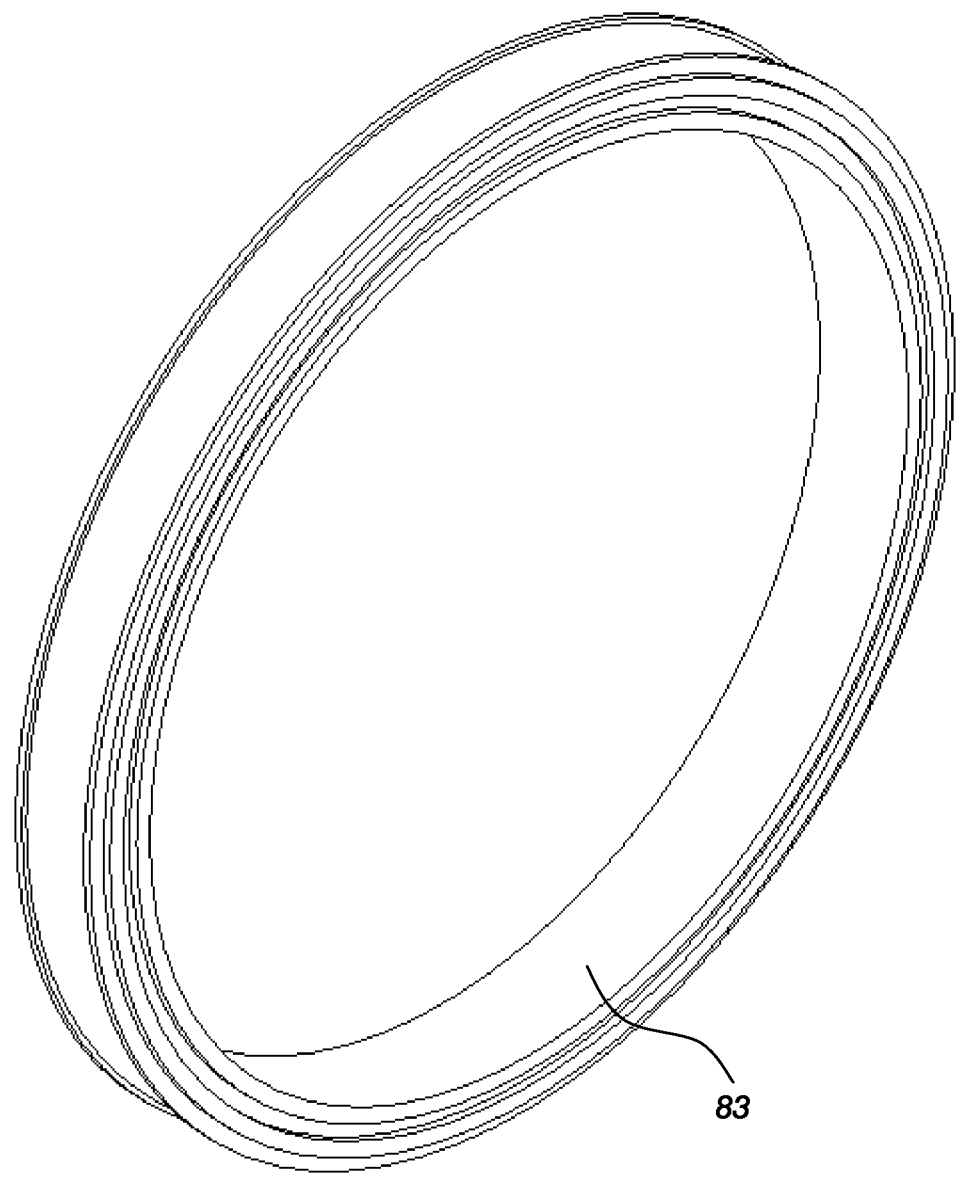
FIG. 18 illustrates a perspective view of an upstream ring member, according to the embodiment of FIG. 1.
Figure 19:
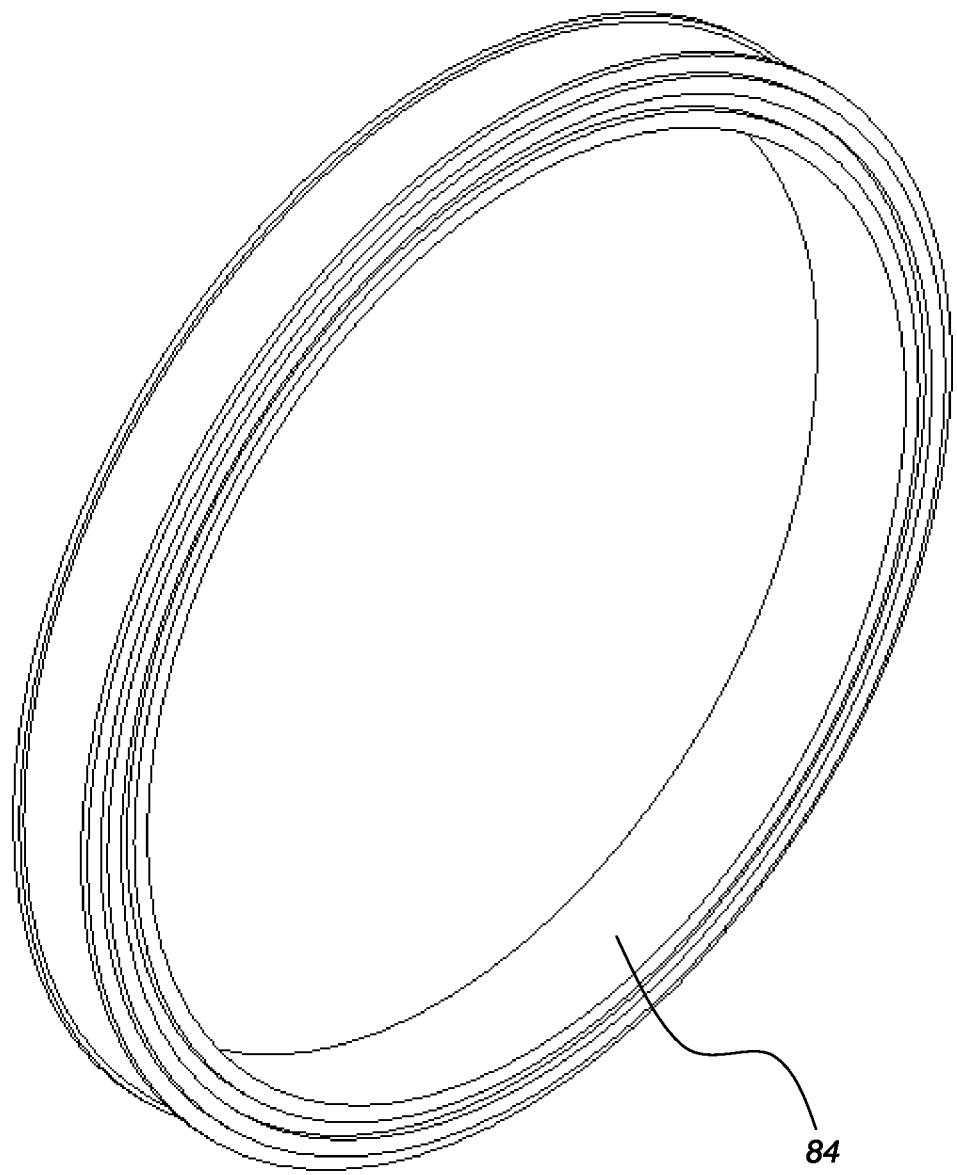
FIG. 19 illustrates a perspective view of a downstream ring member, according to the embodiment of FIG. 1.
Figure 21:
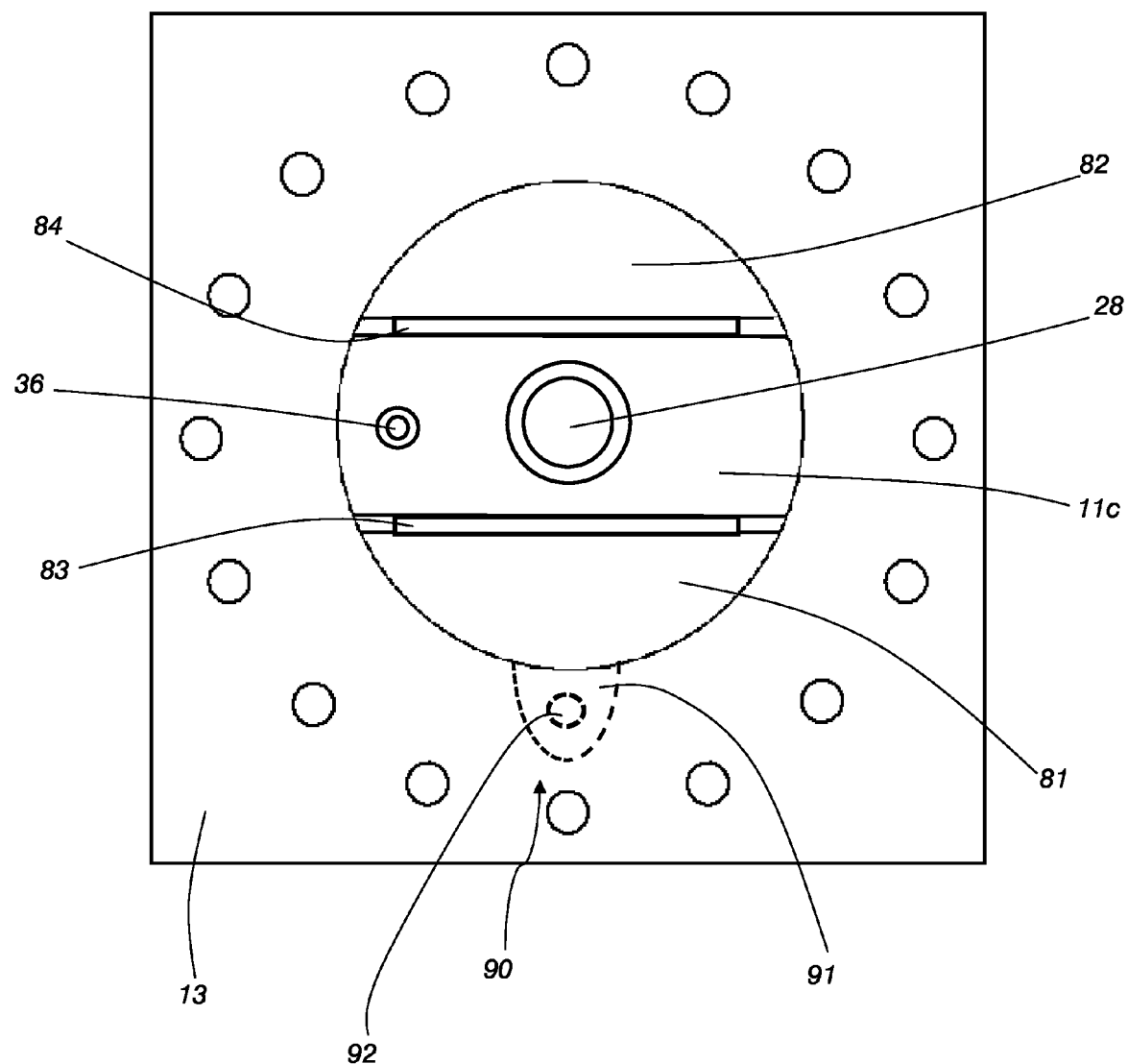
FIG. 21 illustrates a partial cross-sectional top view of a gate valve without a bonnet, according to the embodiment of FIG. 1.

According to an exemplary embodiment of the invention, a gate valve 10 has a valve body 13, a valve body chamber 14, an upstream cavity 16a, and a downstream cavity 16b, as shown in FIGS. 1-5. A valve body 13 is a hollow resilient enclosure, permitting fluid transfer. A valve body chamber 14 is an elongate cavity, depending through the central portion of the valve body 13, as shown in FIGS. 4, 5, 21. An upstream cavity 16a and downstream cavity 16b are elongate longitudinal apertures extending through opposing sides of the valve body 13. An upstream valve cavity housing 81 and downstream valve cavity housing 82 extend into the valve body chamber 14 as shown in FIGS. 5, 21. The upstream valve cavity housing 81 and downstream valve cavity housing 82 extend around the upstream cavity 16a and downstream cavity 16b. An upstream ring member 81 and downstream ring member 82 are placed on the interior surface of the valve body 13, adjacent to the upstream cavity 16a and downstream cavity 16b, as shown in FIGS. 5, 21. The upstream ring member 81 and downstream ring member 82 are resilient circular rings, as shown in FIGS. 18, 19. The gate valve 10 is sealed by a bonnet 80. The bonnet 80 is a resilient pressure sealed enclosure, fixedly attached to the valve body 13, as shown in FIGS. 1-5, 17.

Figure 14:
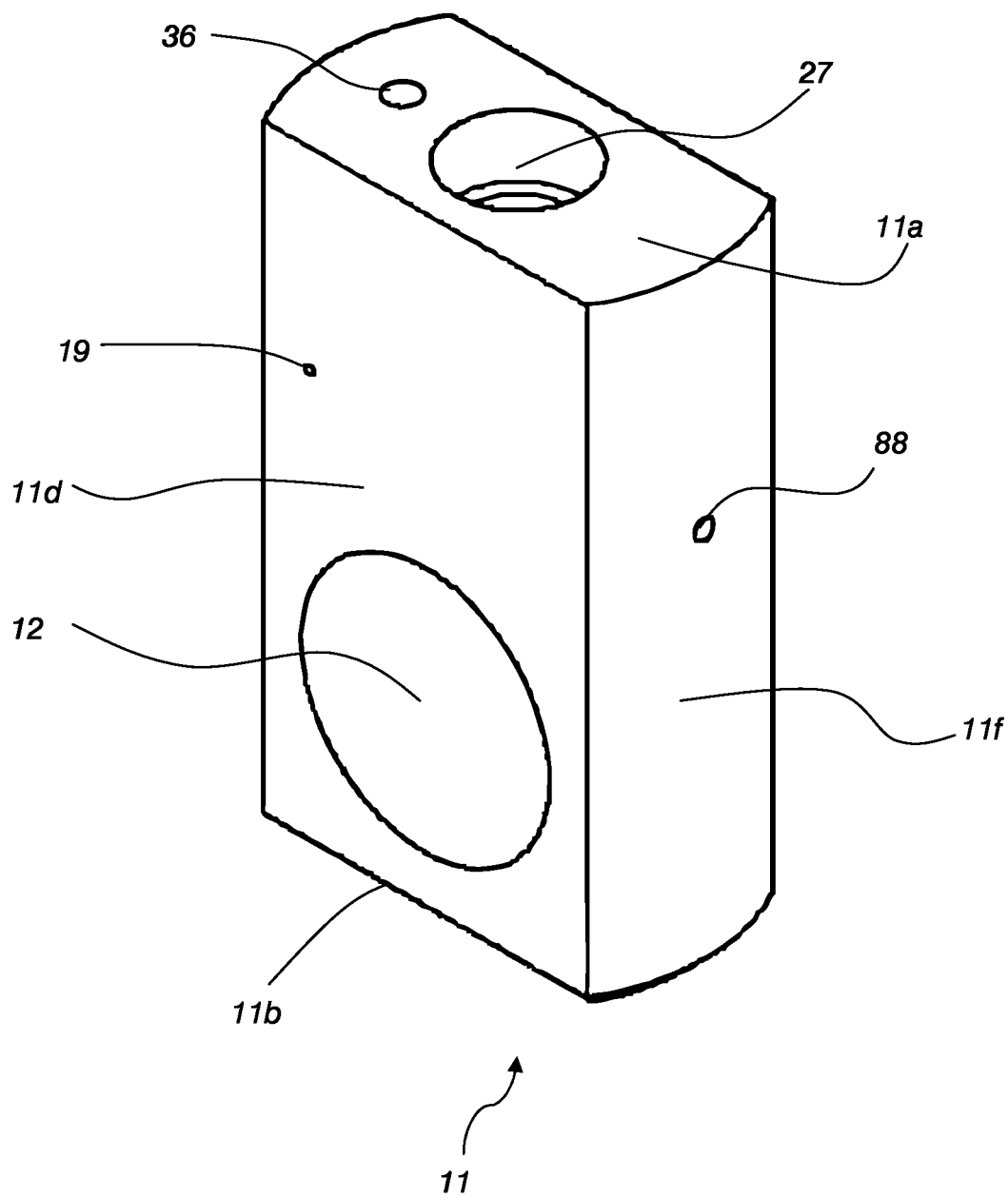
FIG. 14 illustrates a perspective view of a gate, according to the embodiment of FIG. 1.
Figure 15:
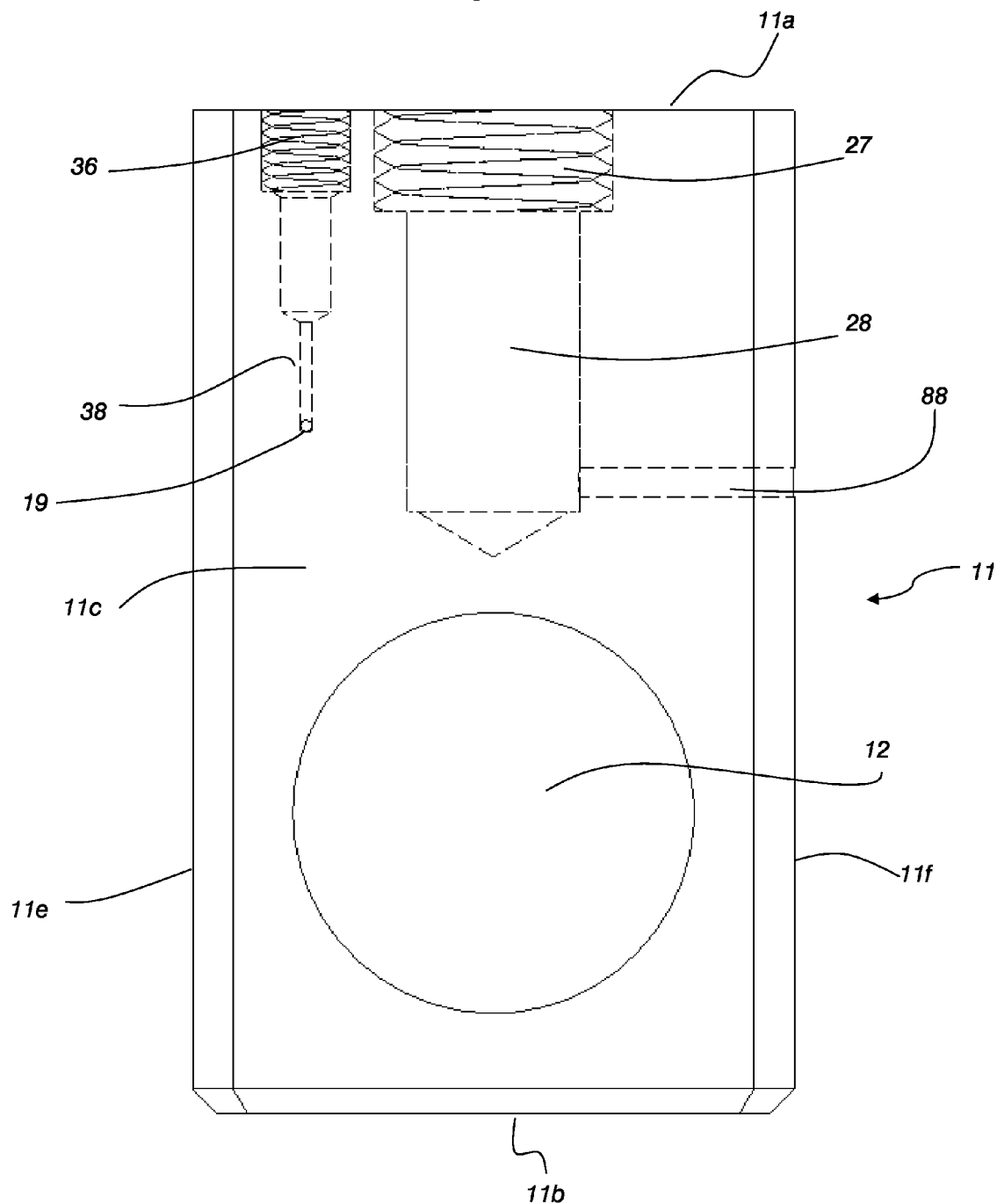
FIG. 15 illustrates a cross-sectional front view of a gate, according to the embodiment of FIG. 1.
Figure 16:
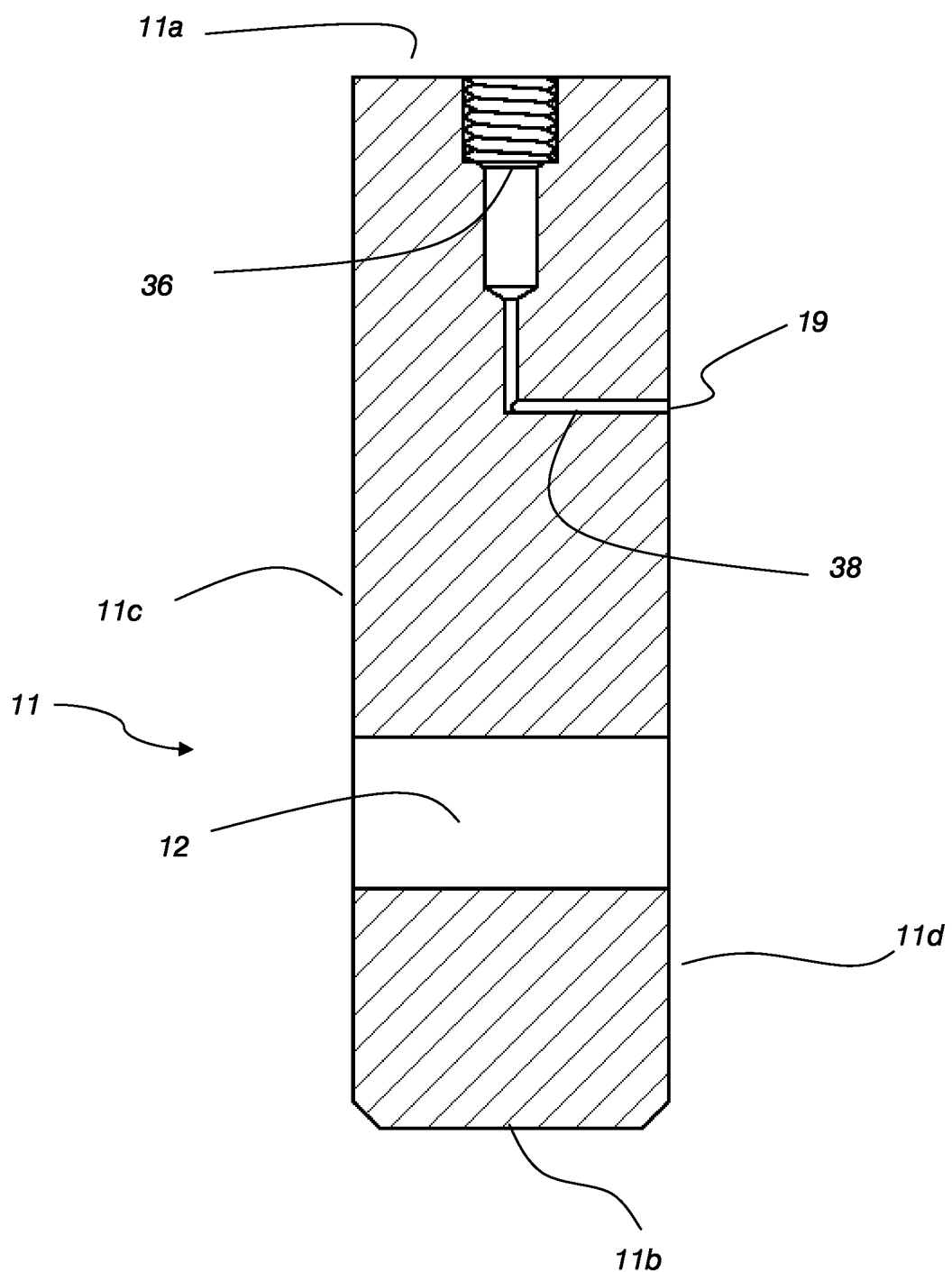
FIG. 16 illustrates a cross-sectional side view of a gate, according to the embodiment of FIG. 1.
Figure 17:
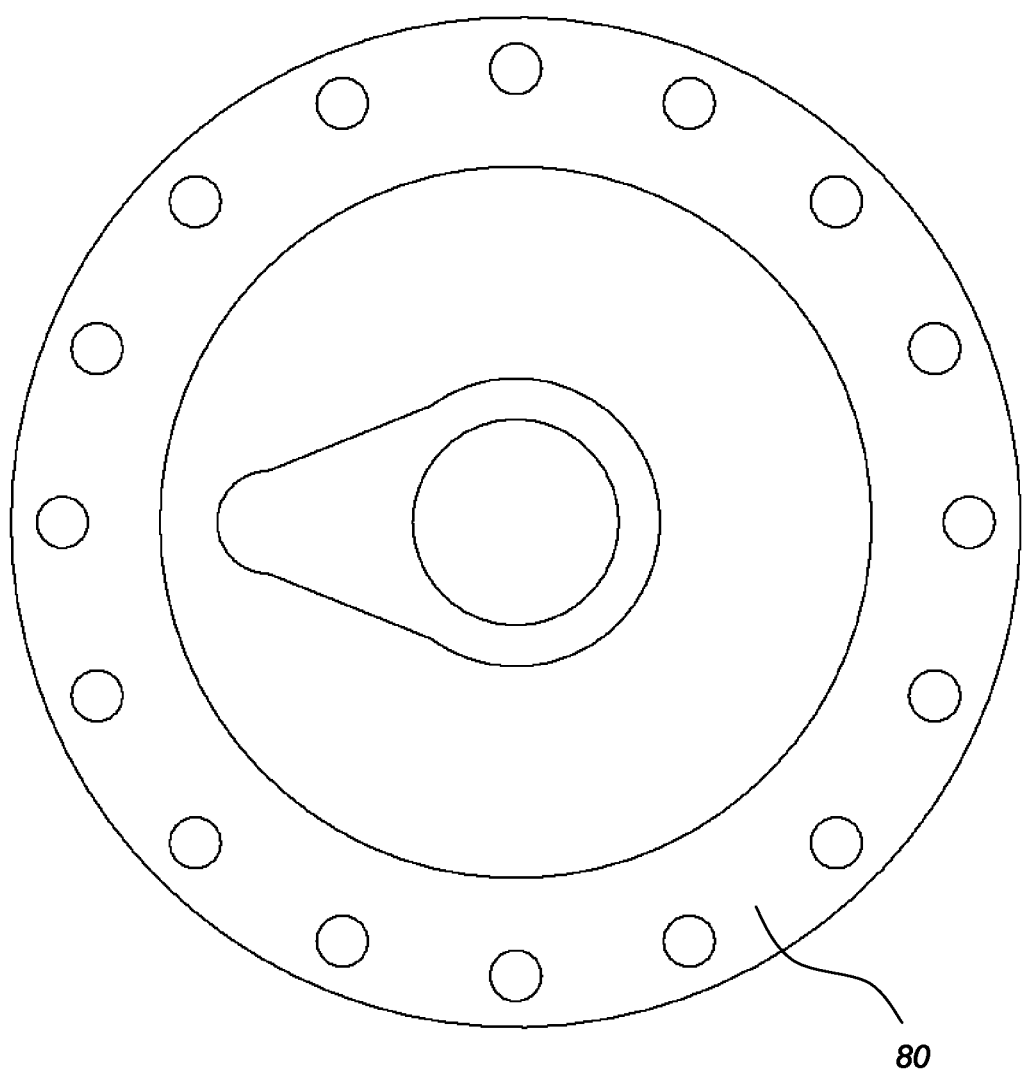
FIG. 17 illustrates a bottom view of a bonnet, according to the embodiment of FIG. 1.

A gate 11 is movable between open and closed positions, and positioned within the valve body chamber 14, as shown in FIGS. 1-5, 21. The gate 11 is a substantially planar resilient member, adapted to form a pressure fluid seal between the upstream cavity 16a and the downstream cavity 16b during operation. The gate 11 has six sides: an upper gate surface 11a; a lower gate surface 11b; an upstream gate surface 11c; a downstream gate surface 11d; and two gate side surfaces 11e, 11f, as shown in FIGS. 14-16. The gate 11 has an equalizing port 19, a coupler receiver 27, a gate cavity 12, and a stem cavity 28. An equalizing port 19 is an aperture on the periphery of the downstream gate surface 11d, positioned near the gate side surface 11e. A coupler receiver 27 is a threaded aperture, centrally disposed on the upper gate surface 11a. A gate cavity 12 is an aperture extending longitudinally through the gate 11, from the upstream gate surface 11c to the downstream gate surface 11d. The nominal dimensions of the gate cavity 12 are approximately the same as the upstream cavity 16a and downstream cavity 16b. A stem cavity 28 is an aperture, centrally disposed on the upper gate surface 11a. The gate 11 may have a grease port 88 for the passage of lubrication fluids. During operation, the upstream gate surface 11c makes direct contact with the upstream ring member 81, forming a pressure seal. Conversely, the downstream gate surface 11d, makes direct contact with the downstream ring member 82, forming a pressure seal.

Figure 20:
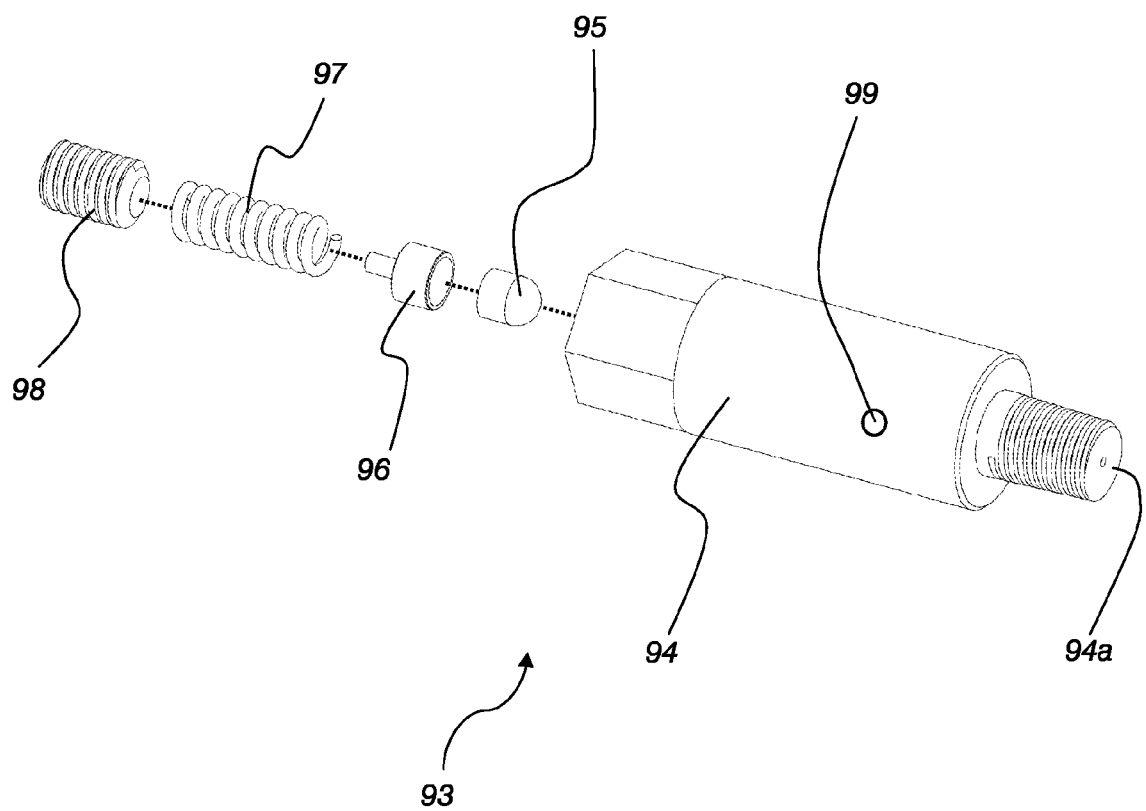
FIG. 20 illustrates an exploded perspective view of a check valve, according to the embodiment of FIG. 1.
Figure 23:
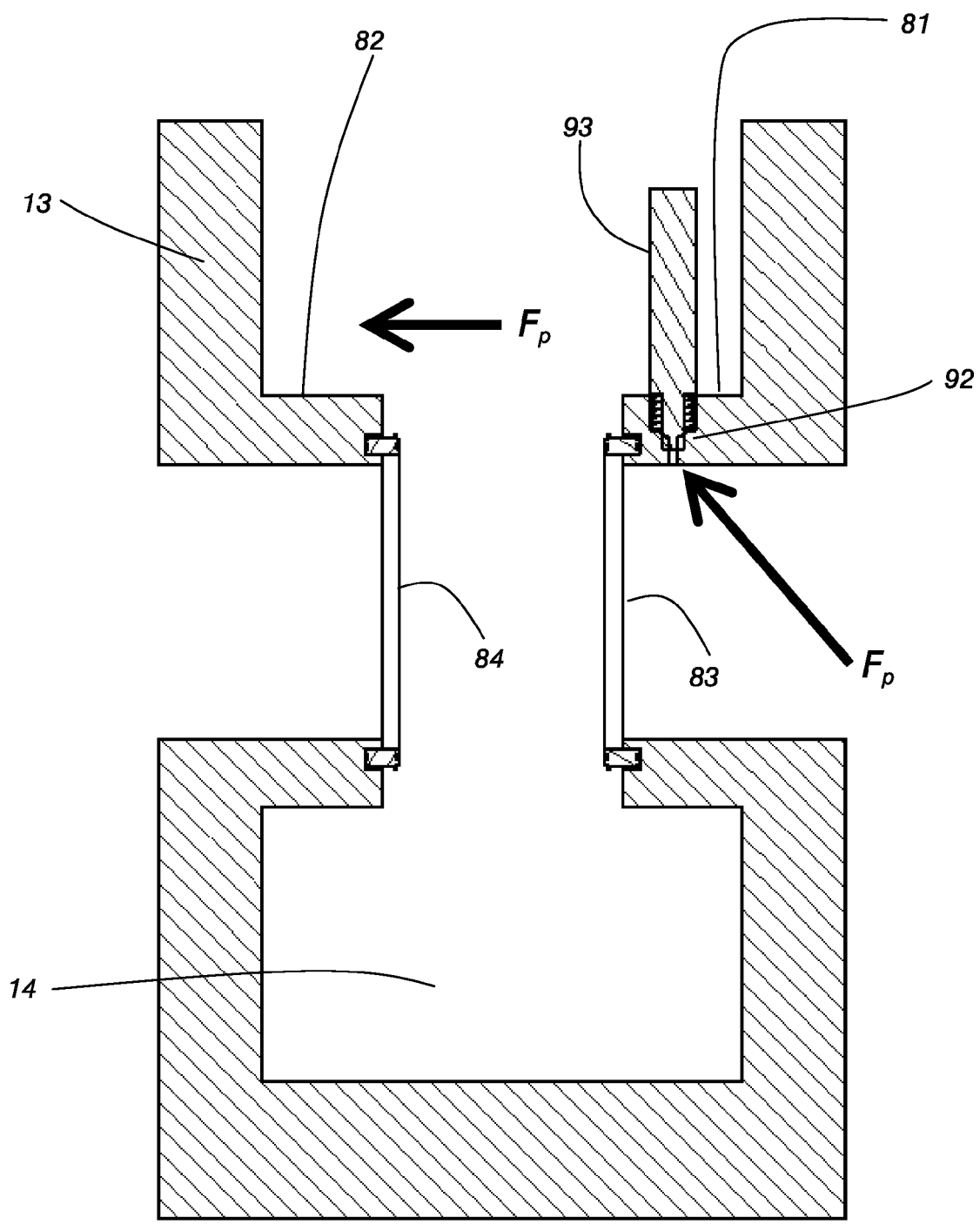
FIG. 23 illustrates a free-body diagram of the fluid pressure force acting against a gate valve body in the closed position of the gate, according to the embodiment of FIG. 1.

In the exemplary embodiment, a preloading valve arrangement 90 is a fluid release valve system allowing fluid to enter the valve body chamber 14 from the upstream cavity 16a. The valve body relief arrangement 90 comprises a preloading relief port 92 and a check valve 93. A preloading relief port 92 is a downwardly depending aperture, extending from the upstream valve cavity housing 81 to the upstream cavity 16a, as shown in FIGS. 21, 23. A check valve 93 is a fluid exchange valve, permitting fluid transfer. The check valve 93 of the exemplary embodiment comprises: a check valve body 94; a check valve seal tip 95; a check valve retainer 96; a check valve spring 97; a check valve nut 98; and a check valve escape port 99, as shown in FIG. 20. A check valve body 94 is a resilient elongate longitudinally extending hollow cylinder, with a threaded tip. An entrance port 94a is an aperture located on the tip of the check valve body 94a. A check valve seal tip 95 is a resilient elongate dome, forming a sealing surface. A check valve retainer 96 is a cylindrical housing member, adapted for placement of the check valve seal tip 95. A check valve spring 97 is an elongate spring, inserted into the interior of the check valve body 94. A check valve nut 98 is a threaded cylindrical nut, secured into the exterior of the check valve body 94. A check valve escape port 99 is an aperture extending from the exterior surface of the check valve body 94, to the interior surface of the check valve body 94. The body relief arrangement 90 has a valve relief recess 91 proximate to the upstream valve cavity housing 81, such that the entrance port 94a is aligned with the preloading relief port 92, as illustrated in FIGS. 4, 21, 23.

Figure 11:
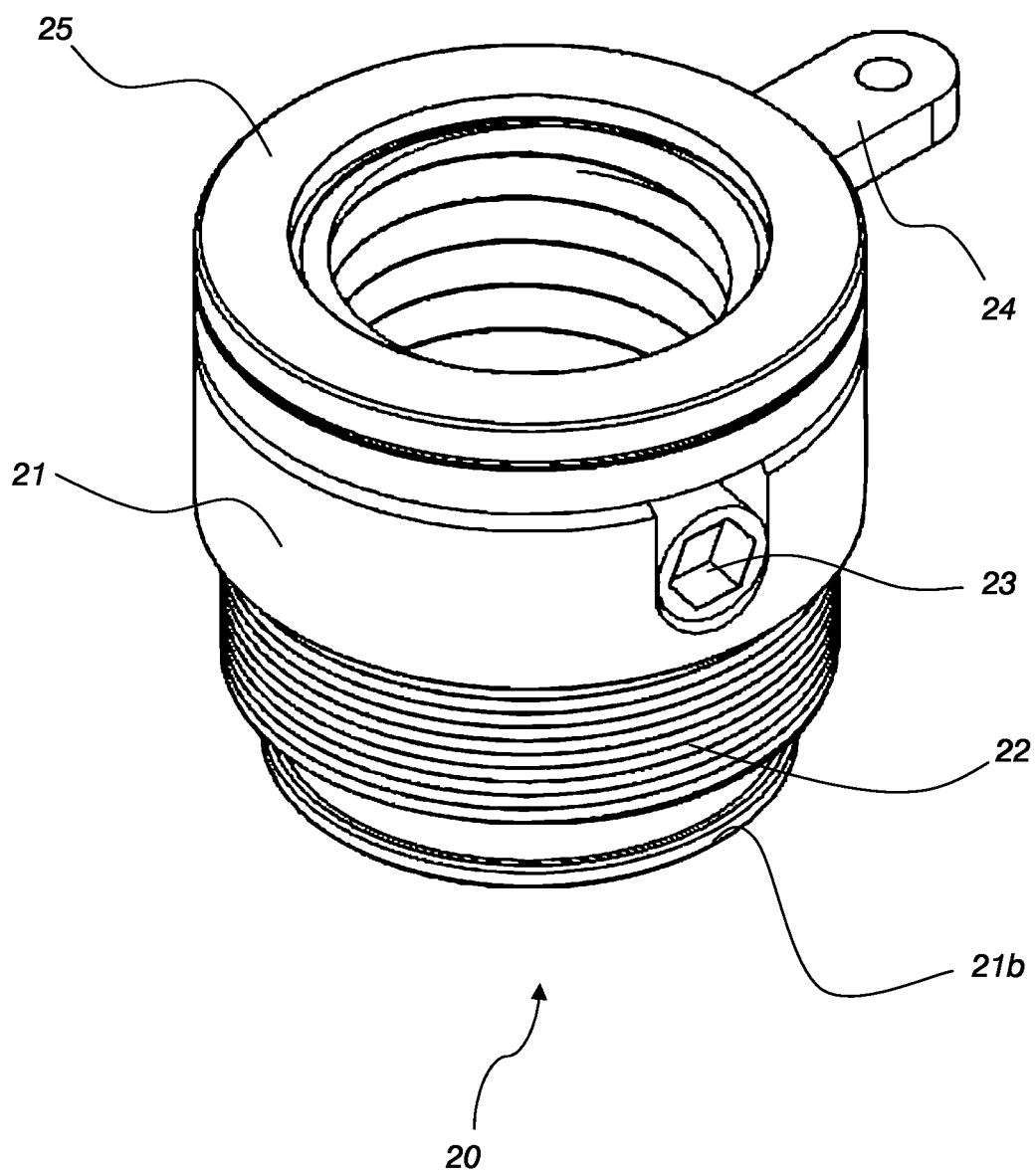
FIG. 11 illustrates a perspective view of a floating coupler assembly, according to the embodiment of FIG. 1.
Figure 12:
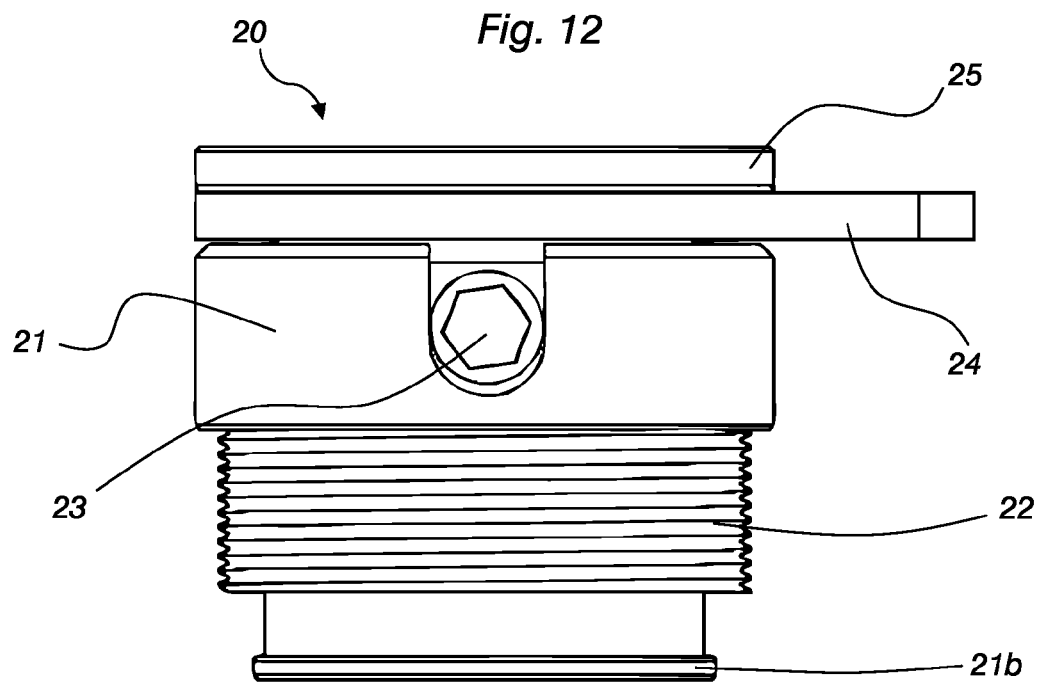
FIG. 12 illustrates a side view of a floating coupler assembly, according to the embodiment of FIG. 1.
Figure 13:
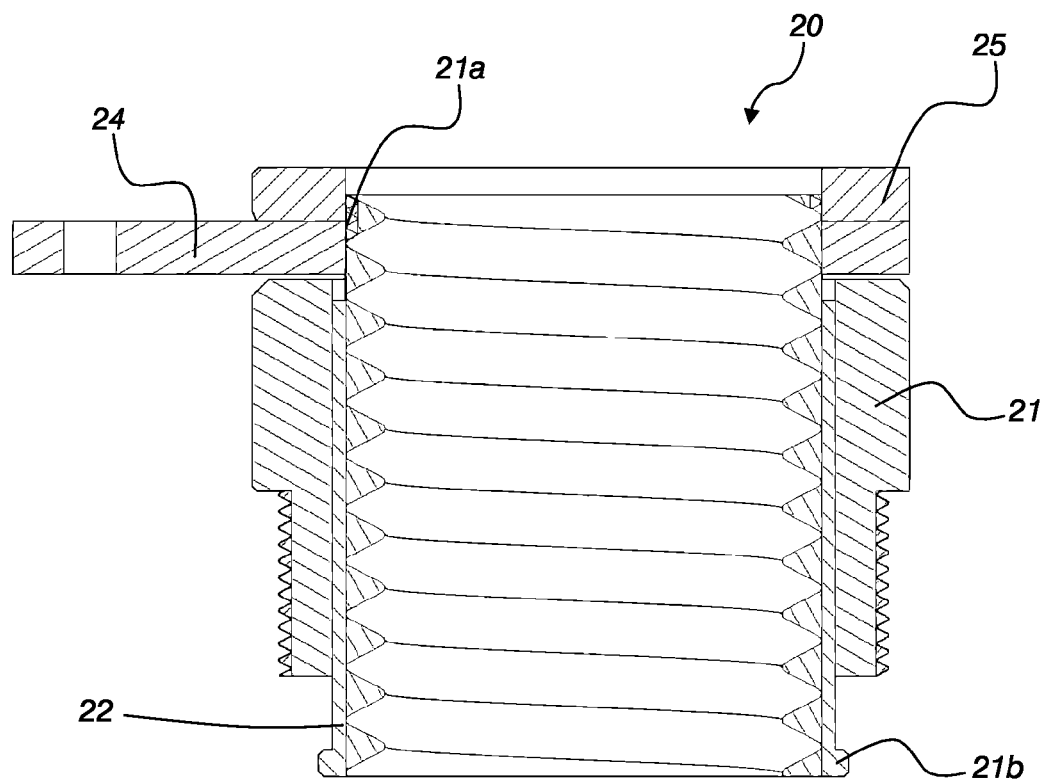
FIG. 13 illustrates a cross-sectional side view of a floating coupler assembly, according to the embodiment of FIG. 1.

A floating coupler assembly 20 is a resilient rigid body floating coupler, which is non-fixedly attached to the gate 11. In the exemplary embodiment, a floating coupler assembly 20 has a slide nut 21, a gate nut 22, a stop bolt 23, a lift arm 24, and a lift arm lock 25 as shown in FIGS. 11-13. A slide nut 21 is a resilient elongate cylinder. The interior surface of the slide nut 21 is threaded. An upper exterior portion of the slide nut 21 is threaded, as shown by 21a in FIG. 13. The slide nut has a slide nut flange 21b extending around its lower exterior surface, as shown in FIGS. 11-13. A gate nut 22 is a resilient elongate cylinder, forming a concentric sleeve around the slide nut 21, as illustrated in FIGS. 11-13. A portion of the exterior surface of the gate nut 22 is threaded. The slide nut 21 is allowed to rise and fall relative to the gate nut 22, wherein the range of motion of the slide nut 21 is limited by the slide nut flange 21b. A stop bolt 23 is a rigid bolt forming a stopping surface against the slide nut 21. The stop bolt 23 is positioned on the exterior surface of the gate nut 22, such that the stop bolt 23 limits lateral motion of the slide nut 21 relative to the gate nut 22. A lift arm 24 is an elongate longitudinally extending rigid member, positioned proximate to the slide nut 22.

The lift arm 24 extends longitudinally perpendicular from the peripheral surface of the slide nut 21. In the exemplary embodiment, the lift arm 24 is positioned such that it rests on slide nut 21. A lift arm lock 25 is a threaded sleeve, which secures the lift arm 24 into a fixed position, relative to the slide nut 21. The gate nut 22 is threaded into the coupler receiver 27 of the gate 11.

Figure 8:
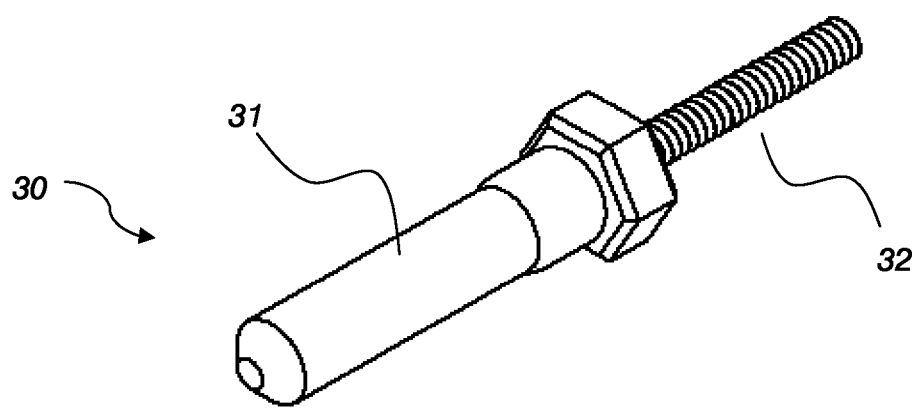
FIG. 8 illustrates a perspective view of a relief valve arrangement, according to the embodiment of FIG. 1.
Figure 9:
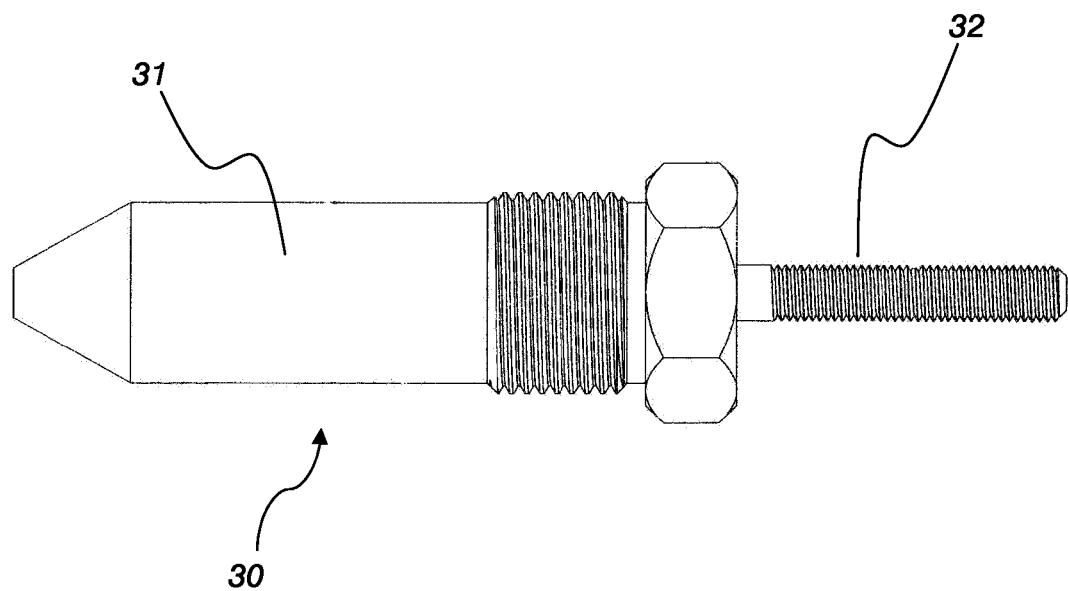
FIG. 9 illustrates a side view of a relief valve arrangement, according to the embodiment of FIG. 1.
Figure 10:
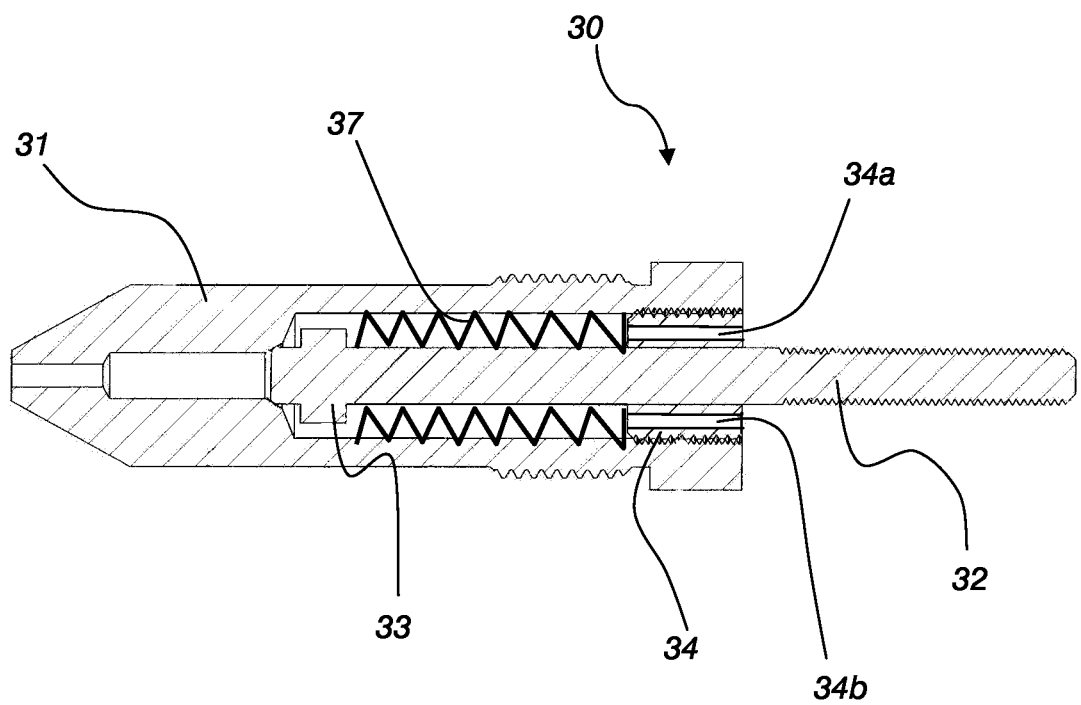
FIG. 10 illustrates a cross-sectional side view of a relief valve arrangement, according to the embodiment of FIG. 1.

A relief valve arrangement 30 is a fluid transfer valve, permitting or restricting the transfer of fluid pressure between the valve body chamber 14 and the downstream cavity 16b prior to opening/closing of the gate 11. The relief valve arrangement 30 of the exemplary embodiment depends comprises: an insert body 31; a relief bolt 32; a stem seal 33; a spring nut 34; a lock nut 35; a relief cavity 36; a return spring 37; and a relief port 38, as shown in FIGS. 8-10. An insert body 31 is a resilient elongate cylinder depending downwardly into the gate 11. A portion of the outer peripheral surface of the insert body 31 is threaded. A relief bolt 32 is a bolt which depends downwardly into the insert body 31 and is attached to the lift arm 24. A stem seal 33 is a cylinder, forming a concentric sleeve around the relief bolt 32, adapted to form a pressure seal. A spring nut 34 is a concentrically threaded nut. The spring nut 34 has two spring nut relief cavities 34a, 34b. The two spring nut relief cavities 34a, 34b are longitudinally extending apertures. The relief cavity 36 is a threaded aperture in the gate upper surface 11a. A return spring 37 is an elongate spring positioned in the interior of the insert body 31, below the spring nut 34. A relief port 38 is an elongate extending channel extending from the relief cavity 36 to the equalizing port 19. As shown in FIG. 5, the relief port 38 depends downwardly from the relief cavity 36, then forms an approximate 90° bend, and extends outwardly meeting the equalizing port 19. The stem seal 24 forms a fluid pressure seal, preventing fluid escape in the closed position of the gate 11. Upward movement of the lift arm 24 unseats the stem seal 33, thereby allowing the circulation of fluid from the valve body chamber 14, through the two spring nut relief cavities 34a, 34b, through the insert body 31, through the relief port 38, through the equalizing port 19, and into the downstream cavity 16b.

A means for control 50 is a control interface, allowing engagement of the floating coupler assembly and opening/closing of the gate valve 10. In the exemplary embodiment, a means for effectuating movement 50 comprises a stem 70 attached to a handwheel 60 as shown in FIGS. 1-4, 6-7. A stem 70 is a threaded member, centrally disposed through the slide nut 21 via a stem thread 71. The stem depends downwardly into the stem cavity 28. The stem 70 of the exemplary embodiment is a nonrising stem (although other types of stems are contemplated by embodiments of the invention), capable of axial rotation. Axial rotation of the stem 70 causes the slide nut 21 to rise/fall a predetermined distance. Further axial rotation of the stem 70 causes the gate 11 to rise/fall within the valve body chamber 14.

During operation of the gate valve 10, the gate 11, operates between open and closed positions, within the gate valve 10. In a closed position, the gate 11 is in a lowered position within the valve body chamber 14, as shown in FIGS. 1-2, 4, 5, 21. Fluid enters the upstream cavity 16a under pressure. Fluid then enters the preloading relief port 92 and compresses the check valve spring 97. Fluid then circulates through the check valve body 94, through the check valve escape port 97, and into the valve body chamber 14. In the closed position, the lift arm 24 is lowered allowing the spring tension in the return spring 37 to exert a downward force on the stem seal 33, such that the stem seal 33 restricts the flow of fluid from the valve body chamber 14 to the relief cavity 36.

To open the gate 11, an operator begins to turn the handwheel 60 counter-clockwise. Turning of the handwheel 60 causes the stem 70 to axially rotate. The axial rotation of the stem 70 and stem thread 71 causes the slide nut 21 to rise, relative to the position of the gate nut 22, stop bolt 23, and gate 11. Rising of the gate nut 22 also causes the lift arm 24 and lift arm lock 25 to rise, relative to the position of the gate nut 22. Rising of the lift arm 24 exerts an upward force on the relief bolt 32, which unseats the stem seal, and compresses the return spring 37. Unseating of the stem seal 33 permits the fluid to flow from the valve body chamber 14 (area of relatively high fluid pressure), through the two spring nut relief cavities 34a, 34b, through the insert body 31, through the relief port 38, through the equalizing port 19, and into the downstream cavity 16b (area of relatively low fluid pressure).

As the operator continues to turn the handwheel 60 counterclockwise, the slide nut 21, lift arm 24 and lift arm lock 25 continue to rise, relative to the position of the gate nut 22, stop bolt 23, and gate 11. After traveling a distance, the slide nut flange 21b restricts further rising of the slide nut 21, lift arm 24 and lift arm lock 25 relative to the position of the gate nut 22, stop bolt 23, and gate 11. Further counter-clockwise rotation of the handwheel 60 axially rotates the stem 70. Axial rotation of the stem 70 exerts an upward force on the slide nut 21 which in turn exerts an upward force on the gate nut 22, stop bolt 23, and gate 11. The gate 11 rises within the valve body chamber 14 to an open position, wherein the gate cavity 12 is aligned between the upstream cavity 16a and downstream cavity 16b, as shown in FIG. 3. Fluid then flows from the upstream cavity 16a to the downstream cavity 16b, by passing through the gate cavity 12.

To close the gate 11, the operator begins to turn the handwheel 60 clockwise. Turning the handwheel 60 clockwise lowers the gate 11 within the valve body chamber 14, until the flow of fluid is restricted by the presence of the gate 11 between the upstream cavity 16a and the downstream cavity 16b.

How the Invention is Used

Embodiments of the invention allow an operator of a gate valve to open/close a gate, especially in systems involving high fluid pressure. The gate is movable between open and closed positions, permitting or restricting the transfer of fluid between opposing sides of the gate valve. The operator operates the gate by opening/closing the gate through a means for control. In the exemplary embodiment, the operator opens/closes the gate by rotating the handwheel attached to the stem. Prior to opening/closing, axial rotation of the stem causes the slide nut to rise/fall. Rising/falling of the slide nut causes the lift arm to rise/fall. The rising/falling of the lift arm unseats/reseats the stem seal, permitting fluid pressure redistribution between upstream/downstream sides of the gate. The fluid pressure redistribution between upstream/downstream sides of the gate during operation allows for greater ease of operation and increased safety.

Embodiments of the invention may be connected to a plurality of pipes or other couplers, in connection with fluid transfer. Embodiments of the invention may be used in conjunction with other gate valves, used individually, or used in series. Embodiments of the invention permit fluid pressure equalization between such systems, especially in systems involving high fluid pressure.

Advantages of the Invention

Figure 22:
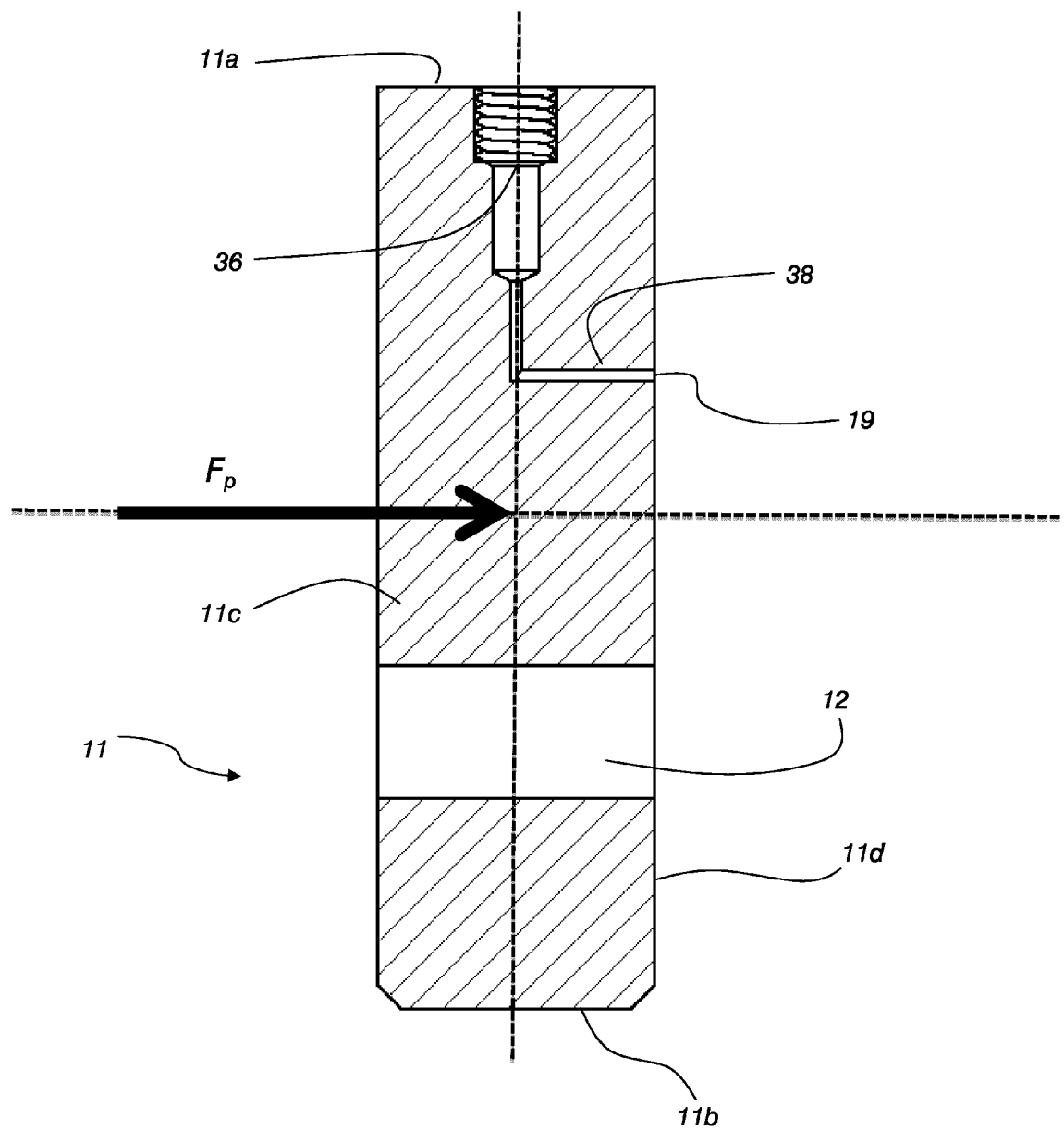
FIG. 22 illustrates a free-body diagram of fluid pressure force acting against one side of a gate in the closed position of the gate, according to the embodiment of FIG. 1.
Figure 24:
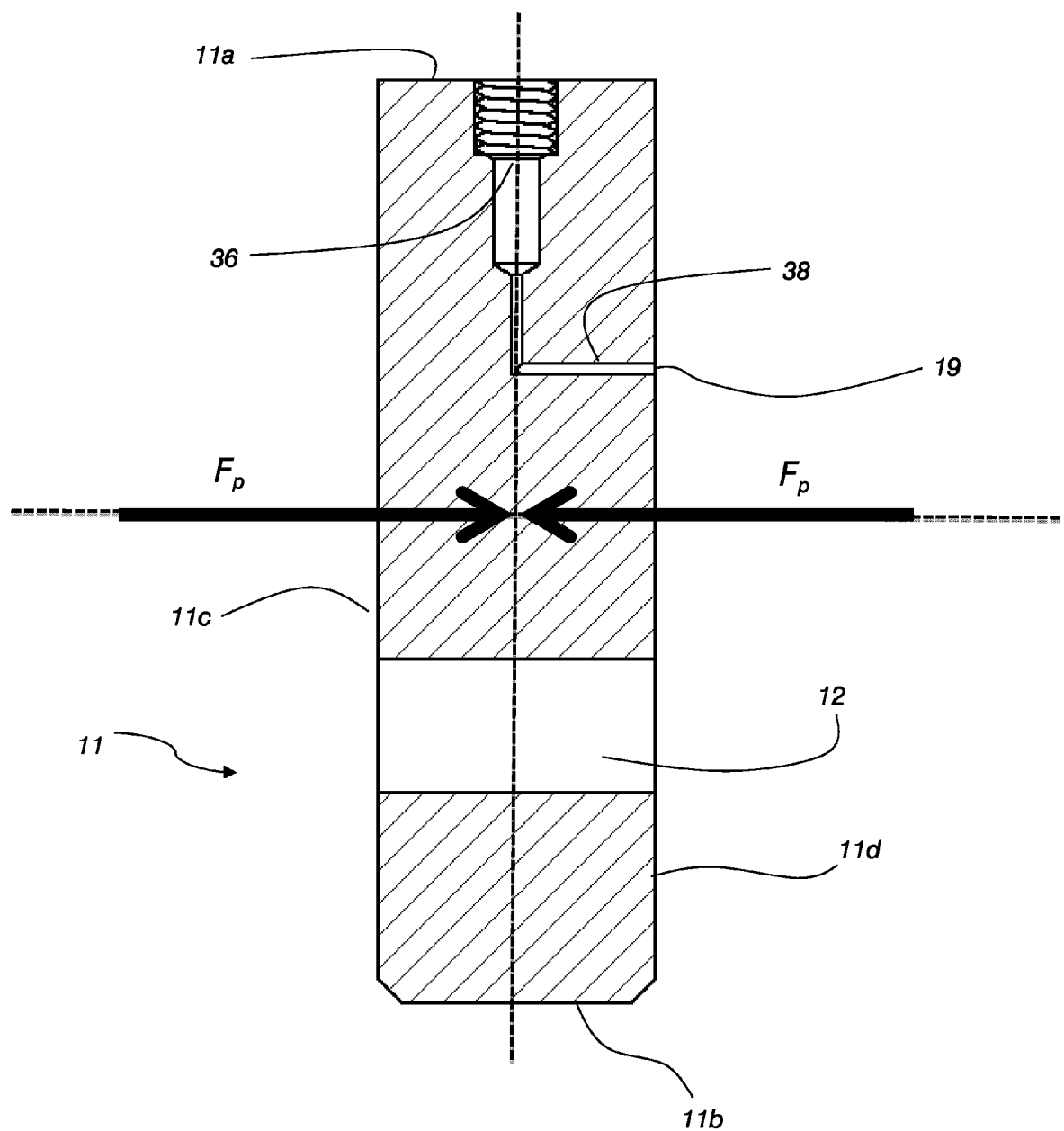
FIG. 24 illustrates a free-body diagram of fluid pressure forces acting against both sides of a gate during opening of the gate, according to the embodiment of FIG. 1.

Embodiments of the invention permit ease of operation in opening/closing of a gate valve. In a closed position of the gate, high pressure fluid exerts a force $F_p$ on one side of the gate, thereby causing a pressure differential on both sides of the gate, as shown in FIG. 22. As the gate is opened, the high pressure fluid and the resulting forces due to fluid pressure $F_p$ are redistributed within the gate valve, as shown in FIG. 23. The forces due to fluid pressure $F_p$ are redistributed prior to the actual lifting of the gate, as shown in FIG. 24. Therefore, the decreased pressure differential allows for ease of operation, and less stress on gate valve components.

Embodiments of the invention does not require the use of externally mounted lines. Internal circulation is permitted by embodiments, thereby protecting surfaces from damage and wear. Circulation of fluids during opening/closing reduces shearing forces on the gate and gate seal. Additionally, fluid circulation reduces the grinding of elements against the gate valve, reducing the risk of malfunction.

Embodiments of invention implement a preloading valve arrangement. The preloading valve arrangement acts as a filter, and may trap dirt, sand, and other sediment before entering the gate valve and prevents erosion of metal material. The preloading valve arrangement also permits internal valve pressure to activate the pressure equalization system of the invention (as opposed to using external fluid pressure). Moreover, the preloading valve arrangement prevents a sudden drop of pressure between the valve body chamber and valve body, and between the valve body chamber and gate.

The preloading valve arrangement may comprise a check valve (however alternative embodiments contemplate using a plurality of check valves or other valve types). A check valve (or plurality of check valves) may used to permit upstream fluid to enter the gate valve. Differing check valve springs may be used to regulate operation. For example, a check valve spring with greater spring tension may used where it is desirable for a certain given fluid pressure level.

Alternatives

Although the embodiments of the invention have been described herein, other embodiments are contemplated by the invention. For example, in an alternate embodiment, the relative path of the relief port may deviate from the exemplary embodiment.

Figure 6:
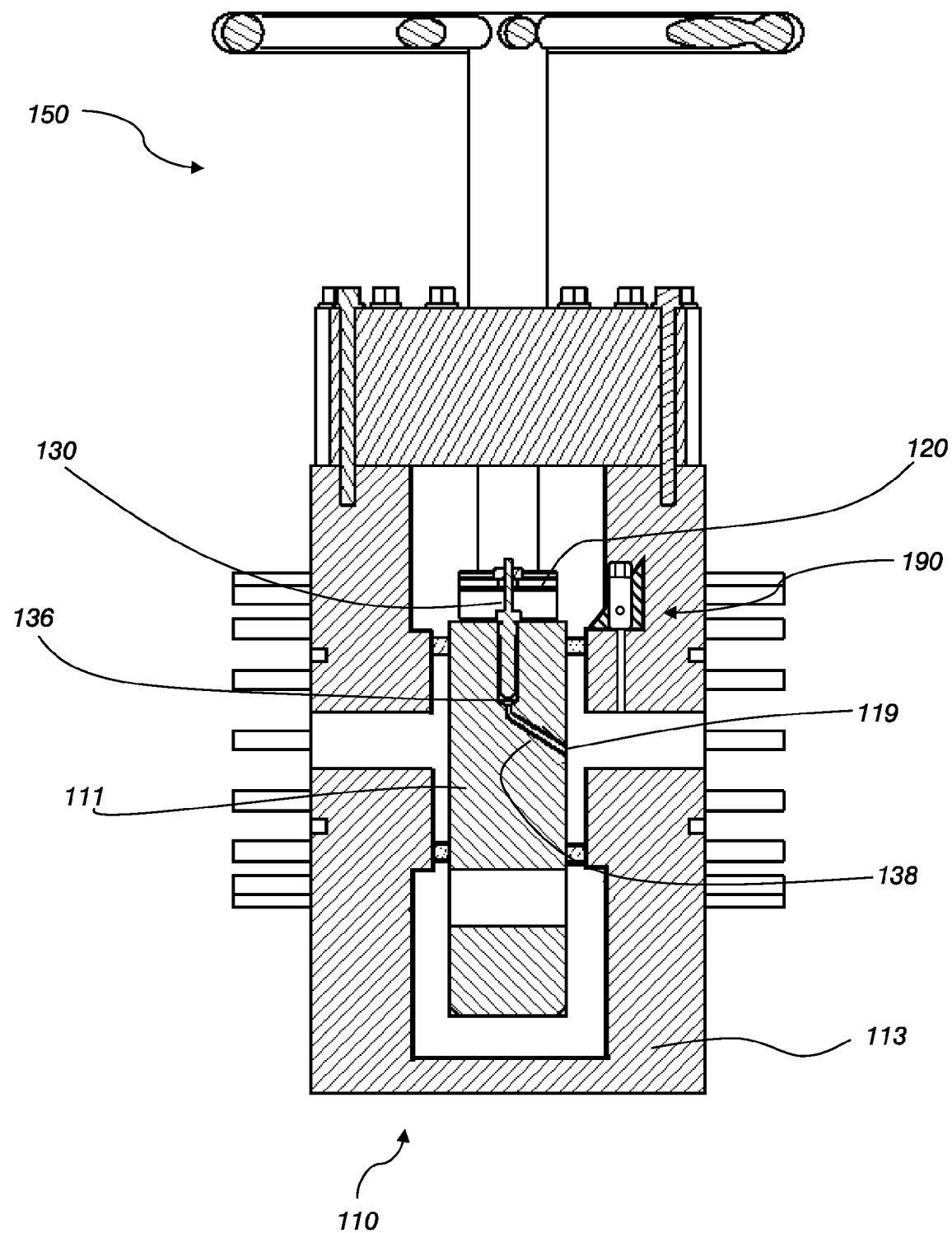
FIG. 6 illustrates a cross-sectional side view of a gate valve pressure equalization system in a closed position, of a first alternate embodiment of the invention.
Figure 7:
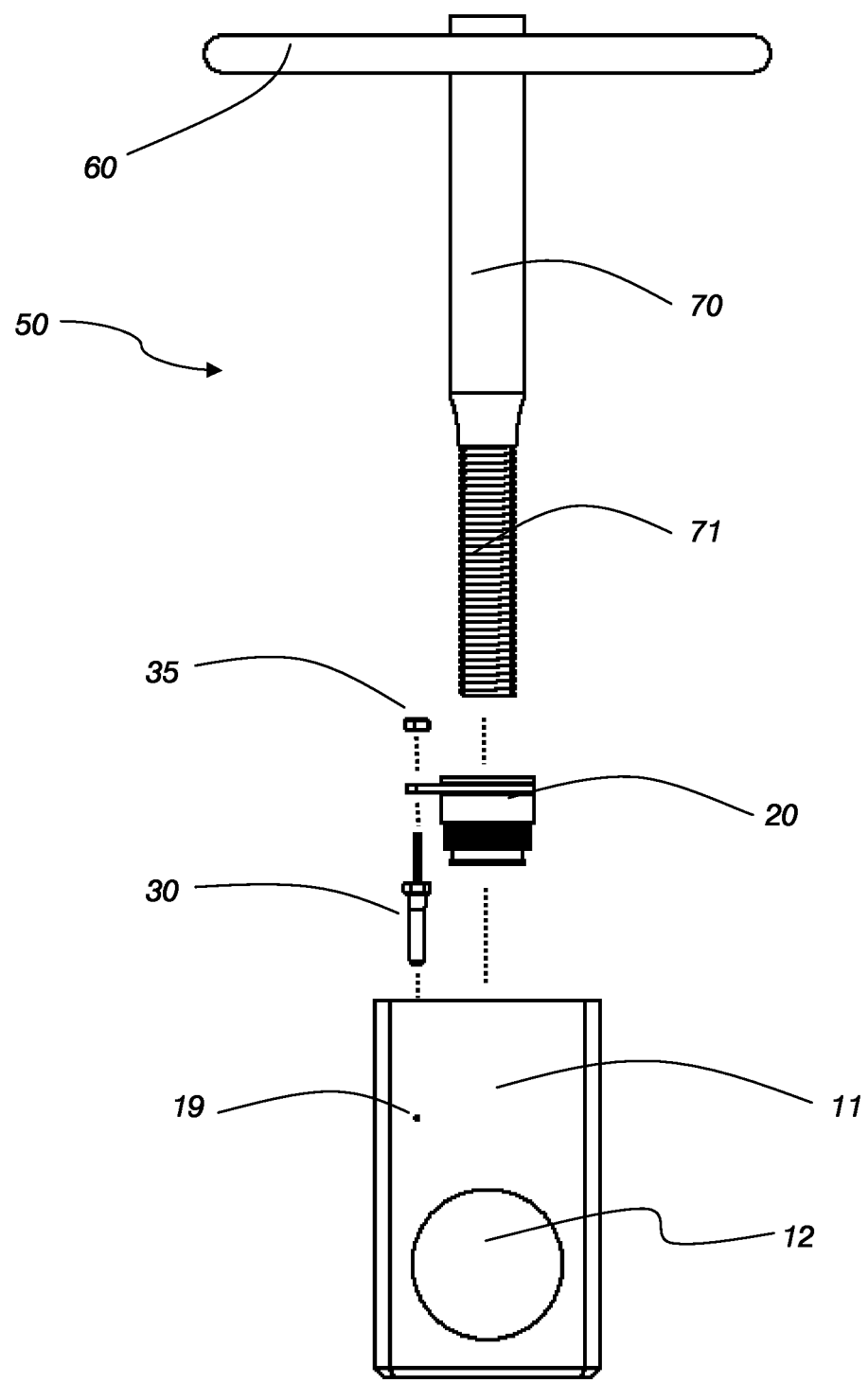
FIG. 7 illustrates a front exploded view of a handwheel, stem, floating coupler assembly, relief valve arrangement, and lock nut, according to the embodiment of FIG. 1.

In a first alternate embodiment, a gate valve pressure equalization system has a gate valve 110, a gate 111, a preloading valve arrangement 190, a floating coupler assembly 120, a relief valve arrangement 130, and a means for control 150, as shown in FIG. 6. However, a relief port 138 depends downwardly from a relief cavity 136, then forms an approximate 45° bend, and extends outwardly meeting an equalizing port 119.

Figure 25:
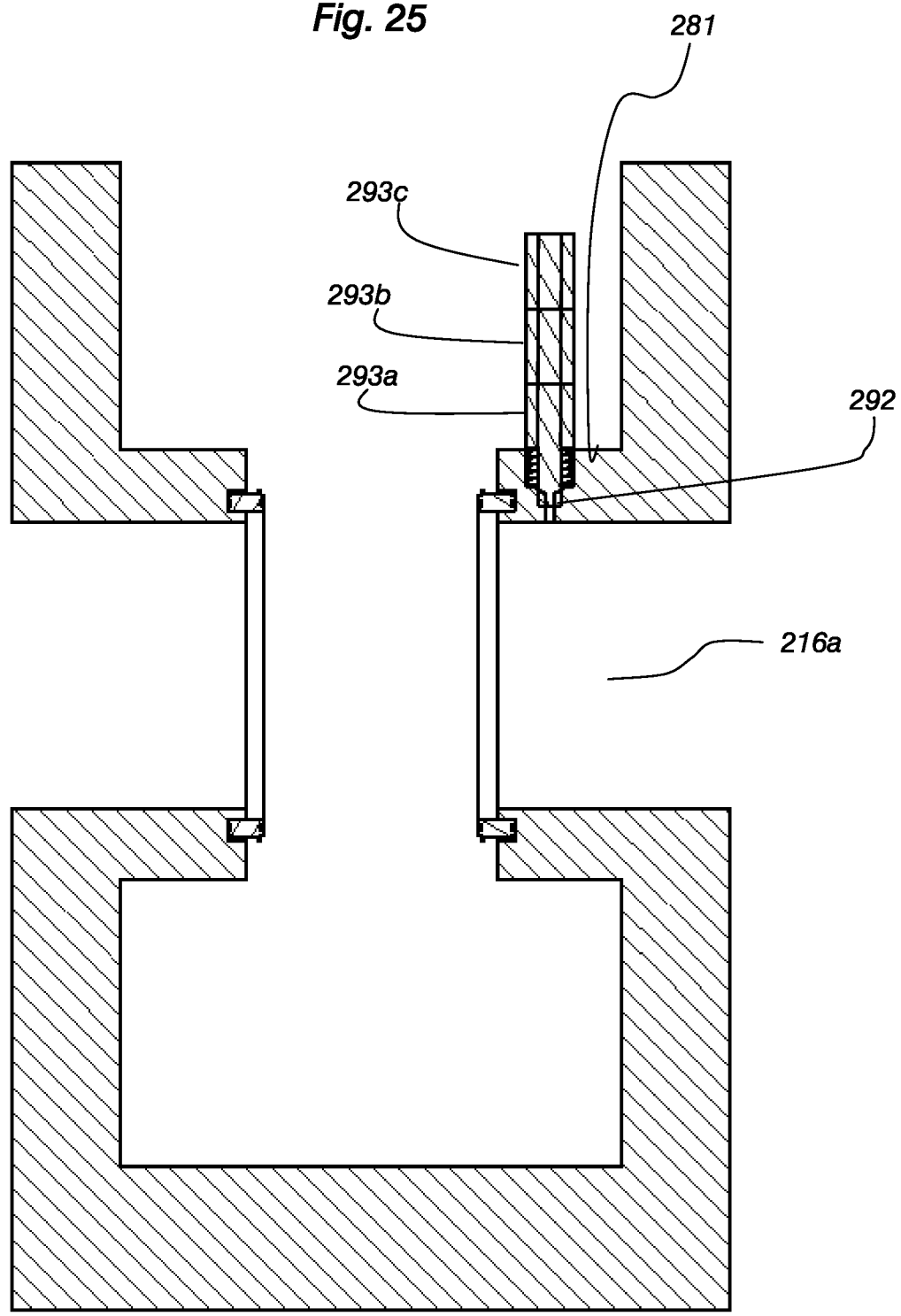
FIG. 25 illustrates a cross-sectional side view of a gate valve body and preloading valve arrangement of a second alternative embodiment of the invention.
Figure 26:
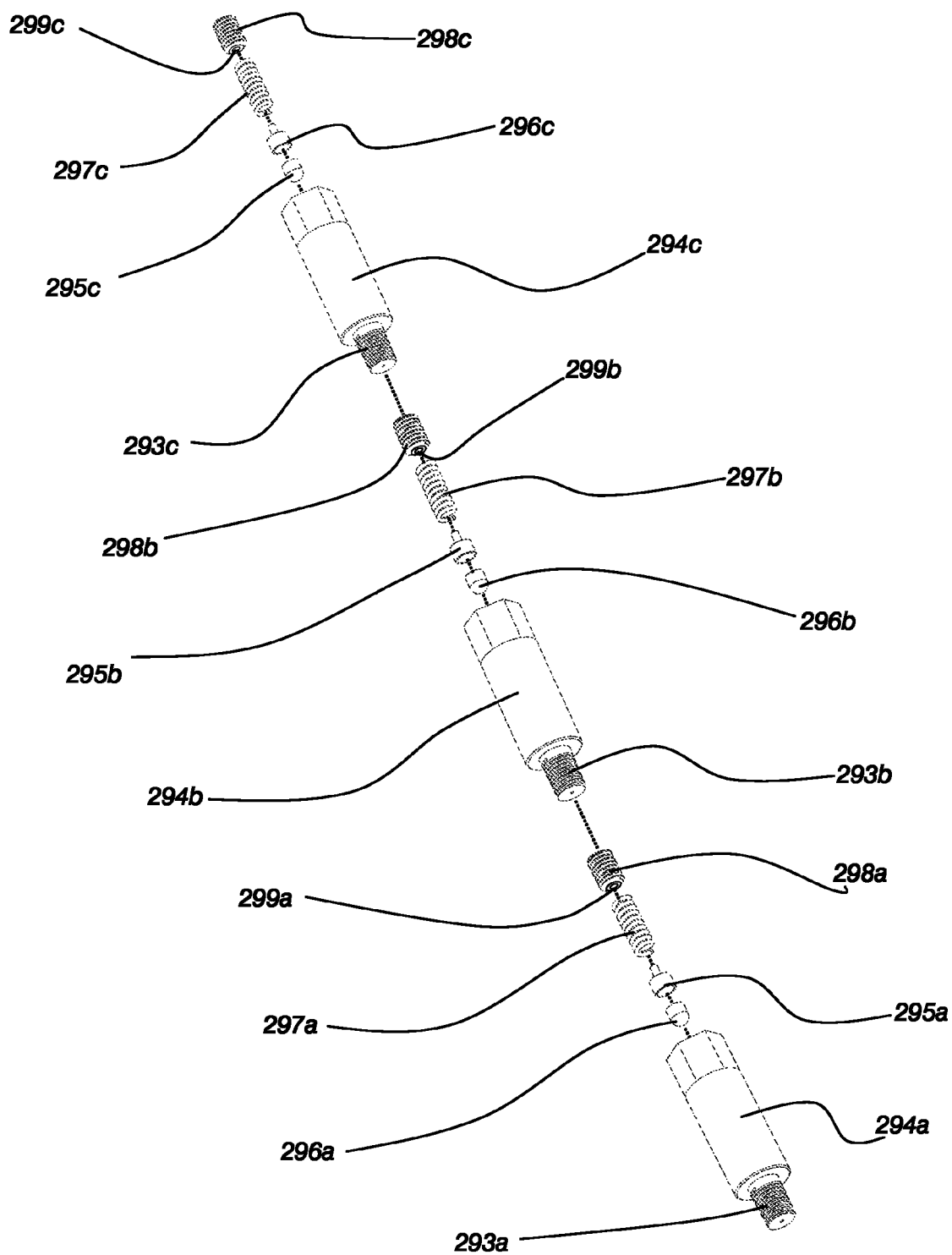
FIG. 26 illustrates an exploded perspective views of a plurality of check valves, according to the embodiment of FIG. 25.

In a second alternate embodiment, a preloading valve arrangement 290 comprises a preloading relief port 292 and three check valves 293a, 293b, 293c as shown in FIG. 25. A preloading relief port 292 is a downwardly depending aperture, extending from an upstream valve cavity housing 281 to an upstream cavity 216a, as shown in FIG. 25. The check valves 293a, 293b, 293c are fluid exchange valves, permitting fluid transfer. The check valves 293a, 293b, 293c are stacked end-to-end, as shown in FIGS. 25, 26. Each check valve 293a, 293b, 293c comprises: a check valve body 294a, 294b, 294c; a check valve seal tip 295a, 295b, 295c; a check valve retainer 296a, 296b, 296c; a check valve spring 297a, 297b, 297c; a check valve nut 298a, 298b, 298c; and a check valve escape port 299a, 299b, 299c, as shown in FIG. 26. A check valve escape port 299a, 299b, 299c is an aperture extending through the check valve nut 298a, 298b, 298c, as shown in FIG. 26. The check valves 293a, 293b, 293c are located proximate to the upstream valve cavity housing 281, aligned such that fluid may flow from the preloading relief port 292 into each check valve body 294a, 294b, 294c, as illustrated in FIG. 25.

The physical arrangement of the gate valve and gate may differ from the exemplary embodiment. For example, the exemplary embodiment describes a gate valve wherein the gate is raised to open position and lowered to closed position. The gate may also be lowered into an open position and raised to closed position.

The means for effectuating gate movement may incorporate other designs for raising/lowering the gate. The exemplary embodiment describes a non-rising stem, however, the stem may also be rising stem.

Implementation of the inventive concept may include differing types of gate valves including: a sluice valve; a knife gate; a slide gate; a parallel gate valve; a flexible wedge gate valve; a solid wedge gate valve; a split wedge gate valve; globe valve; or a parallel slide gate.

Differing types of relief valves and check valves may be used, including: a spring-loaded pressure release valve; a ruptured disc and pin valve; or a balanced bellows valve.

The bonnet may also be: a screw-in bonnet; a union bonnet; or a pressure-sealed bonnet.

The preloading valve arrangement may implement one or a plurality of valves. Such valves may be of differing types and permutations thereof.

Differing combinations and permutations of the embodiments set forth are contemplated by the current invention. Additionally, all functional equivalents of materials used and means of attachment of elements are contemplated by the current invention. Therefore, the spirit and scope of the appended claims should not be limited to the descriptions of the preferred versions and alternate embodiments set forth herein.

Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112, ¶6.

What is claimed is:

1. A gate valve pressure equalization system comprising: a gate valve; a gate mounted in said gate valve, wherein said gate is movable between open and closed positions; a preloading valve arrangement; a floating coupler assembly further comprising a slide nut and a lift arm; a relief valve arrangement; and a means for control further comprising a stem attached to a handwheel, wherein said stem is centrally disposed through said floating coupler assembly; wherein axial rotation of said stem causes movement of said slide nut, and wherein movement of said slide nut causes said lift arm to engage said relief valve arrangement, thereby allowing redistribution of fluid pressure between opposing sides of said gate.

2. The gate valve pressure equalization system of claim 1, wherein said gate valve is sealed by a bonnet; said gate valve having a valve body, a valve body chamber, an upstream cavity, and a downstream cavity.

3. The gate valve pressure equalization system of claim 1, wherein an upstream ring member and downstream form a seal against said gate, within said valve body.

4. The gate valve pressure equalization system of claim 1, wherein said gate has an equalizing port, a coupler receiver, a gate cavity, and a stem cavity.

5. The gate valve pressure equalization system of claim 4, wherein said gate has a grease port.

6. The gate valve pressure equalization system of claim 1, wherein said preloading valve arrangement comprises a preloading relief port and a check valve, proximate to an upstream side of said gate valve.

7. The gate valve pressure equalization system of claim 6, wherein said check valve comprises a check valve body; a check valve seal tip; a check valve retainer; a check valve spring; a check valve nut; and a check valve escape port.

8. The gate valve pressure equalization system of claim 6, wherein said check valve is aligned with said preloading relief port, proximate to on an upstream side of said gate valve.

9. The gate valve pressure equalization system of claim 8, wherein fluid passes from said upstream side of said gate valve through said preloading relief port, through said check valve, and into said gate valve upon the introduction of fluid under pressure from said upstream side of said gate valve.

10. The gate valve pressure equalization system of claim 1, wherein said preloading valve arrangement comprises a preloading relief port and a plurality of check valves.

11. The gate valve pressure equalization system of claim 1, wherein said floating coupler assembly further comprises a gate nut, a stop bolt, and a lift arm lock.

12. The gate valve pressure equalization system of claim 1, wherein said floating coupler assembly is non-fixedly attached to said gate.

13. The gate valve pressure equalization system of claim 1, wherein said relief valve arrangement comprises: an insert body; a relief bolt; a stem seal; a spring nut; a lock nut; a relief cavity; a return spring; and a relief port.

14. The gate valve pressure equalization system of claim 13, wherein said relief port extends from an upper surface of said gate to a downstream surface of said gate at an approximate 90° angle.

15. The gate valve pressure equalization system of claim 13, wherein said relief port extends from an upper surface of said gate to a downstream surface of said gate at an approximate 45° angle.

16. A gate valve pressure equalization system comprising: a gate valve; a gate mounted in said gate valve, wherein said gate is movable between open and closed positions; a preloading valve arrangement permitting fluid to enter said gate valve from an upstream side of said gate valve; a floating coupler assembly non-fixedly attached to said gate, said floating coupler assembly further comprising a slide nut, a gate nut, a stop bolt, a lift arm, and a lift arm lock; a relief valve arrangement, and a means for control, wherein said means for control actuates said floating coupler assembly to engage said relief valve arrangement, thereby allowing redistribution of fluid pressure between opposing sides of said gate.

17. A gate valve pressure equalization system comprising: a gate valve having a valve body chamber depending through said gate valve, said gate valve permitting fluid transfer from an upstream cavity of said gate valve to a downstream cavity of said gate valve; a gate movable between open and closed position, said gate positioned within said valve body chamber to form a pressure fluid seal between said upstream cavity and said downstream cavity; a preloading valve arrangement allowing fluid to enter said gate valve from said upstream cavity through a check valve and preloading relief port; a floating coupler assembly having a slide nut, a gate nut, a stop bolt, a lift arm, and a lift arm lock; a relief valve arrangement having an insert body, a relief bolt, a stem seal, a spring nut, a lock nut, a relief cavity, a return spring, and a relief port; a handwheel attached to a stem, wherein axial rotation of said stem causes movement of said lift arm, thereby unseating said stem seal, which allows fluid circulation between upstream and downstream sides of said gate, and wherein further axial rotation of said stem causes movement of said gate within said valve body chamber.

\* \* \* \* \*